United States Patent
Jiang et al.

(10) Patent No.: US 11,233,567 B2
(45) Date of Patent: Jan. 25, 2022

(54) LIGHT SOURCES COMMUNICATION METHOD AND APPARATUS

(71) Applicant: HUAWEI TECHNOLOGIES CO., LTD., Guangdong (CN)

(72) Inventors: Tong Jiang, Beijing (CN); Pengfei Luo, Beijing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 16/919,913

(22) Filed: Jul. 2, 2020

(65) Prior Publication Data

US 2020/0336206 A1 Oct. 22, 2020

Related U.S. Application Data

(63) Continuation of application No. PCT/CN2018/071668, filed on Jan. 5, 2018.

(51) Int. Cl.
*H04B 10/114* (2013.01)
*H04B 10/116* (2013.01)
(Continued)

(52) U.S. Cl.
CPC ....... *H04B 10/116* (2013.01); *H04B 10/2581* (2013.01); *H04B 10/278* (2013.01); *H04B 10/502* (2013.01)

(58) Field of Classification Search
CPC ...... H04B 10/114–116; H04B 10/2581; H04B 10/278; H04B 10/502
See application file for complete search history.

(56) References Cited

U.S. PATENT DOCUMENTS

2004/0246891 A1 12/2004 Kay et al.
2009/0310971 A1* 12/2009 Kim .................. H04W 28/16
398/103
(Continued)

FOREIGN PATENT DOCUMENTS

CN 101778448 A 7/2010
CN 102158268 A 8/2011
(Continued)

OTHER PUBLICATIONS

PCT International Search Report and Written Opinion issued in International Application No. PCT/CN2018/071668 dated Aug. 22, 2018, 15 pages (with English translation).
(Continued)

*Primary Examiner* — Nathan M Cors
(74) *Attorney, Agent, or Firm* — Fish & Richardson P.C.

(57) ABSTRACT

Embodiments of this application disclose a communication method and an apparatus, and relate to the communications field, to resolve a problem of how to simultaneously perform transmission by using a plurality of light sources and increase transmission efficiency in a multi-light source scenario in an optical camera communications system. A specific solution is: generating N physical frames, where each of the physical frames includes a preamble, a mode indication, and valid data, the mode indication is used to indicate a sending mode of N light sources, the sending mode is a diversity mode or a multiplexing mode, and N is a positive integer greater than or equal to 2; and sending the N physical frames by using the N light sources, where one light source sends one physical frame. The embodiments of this application are used in an optical camera communication process.

13 Claims, 11 Drawing Sheets

(51) Int. Cl.
    *H04B 10/2581*     (2013.01)
    *H04B 10/278*     (2013.01)
    *H04B 10/50*     (2013.01)

(56) References Cited

U.S. PATENT DOCUMENTS

| | | | |
|---|---|---|---|
| 2010/0158523 A1 | 6/2010 | Han et al. | |
| 2011/0069957 A1* | 3/2011 | Kim | H04B 10/1149 398/75 |
| 2011/0105134 A1* | 5/2011 | Kim | H04W 72/048 455/450 |
| 2017/0373753 A1* | 12/2017 | Darabi | H04B 10/66 |
| 2020/0177277 A1* | 6/2020 | Seyvet | H04B 10/1149 |

FOREIGN PATENT DOCUMENTS

| | | |
|---|---|---|
| CN | 102415020 A | 4/2012 |
| CN | 106559902 A | 4/2017 |
| CN | 106605377 A | 4/2017 |

OTHER PUBLICATIONS

Office Action issued in Chinese Application No. 201880081677.9 dated Dec. 2, 2020, 5 pages.
Sun Chong et al., "Physical Layer Frame Structure Design and Implementation in SC-UWB System," Wide band network, vol. 34, No. 8, 2010, 4 pages.

\* cited by examiner

LIGHT SOURCES COMMUNICATION METHOD AND APPARATUS

CROSS-REFERENCE TO RELATED APPLICATIONS

This application is a continuation of International Patent Application No. PCT/CN2018/071668, filed on Jan. 5, 2018, the disclosure of which is hereby incorporated by reference in its entirety.

TECHNICAL FIELD

Embodiments of this application relate to the communications field, and in particular, to a communication method and an apparatus.

BACKGROUND

With development of light-emitting diode (Light-emitting Diode, LED) technologies, such an LED lamp that is energy-efficient, small in size, and has a long life span is widely applied to scenarios such as lighting, indication, and a screen display. In addition, an LED has a good time response characteristic, and a signal can be sent out by using a high-speed bright-dark flicker that cannot be observed through naked eyes. In this way, the LED has a potential to serve as a signal transmitter in an optical communications system. Therefore, a visible light communication (Visible Light Communication, VLC) technology is becoming a topic of increasing concern in the lighting industry and the communications industry.

Generally, for one LED optical signal, a photodiode (photodiode, PD) may serve as a photodetector, and for a plurality of LED optical signals, an image sensor (Image Sensor, IS) including a PD array may serve as a photoelectric receiver. Currently, modules such as LED light sources and cameras are built in devices such as mobile phones and cars. Although these light sources and these cameras are used only for lighting and video shooting, the light sources and the cameras lay a hardware foundation for actual application of an IS-based VLC system. Optical camera communication (Optical Camera Communication, OCC) between an LED light source and an optical camera can be implemented only by simply reconstructing the light source and the camera. Undersampled pulse width modulation (Undersampled Pulse Width Modulation, UPWM) is a camera communications technology that can implement zero flicker, and can achieve comparatively high spectral utilization. However, in an existing OCC system based on UPWM, only camera communication for a single light source is specified, but a communication method for a plurality of light sources is not specified. Therefore, for a multi-light source scenario, how to simultaneously perform transmission by using the plurality of light sources and increase transmission efficiency is a problem that urgently needs to be resolved.

SUMMARY

Embodiments of this application provide a communication method and an apparatus, to resolve a problem of how to simultaneously perform transmission by using a plurality of light sources and increase transmission efficiency in a multi-light source scenario in an optical camera communications system.

To achieve the foregoing objectives, the following technical solutions are used in the embodiments of this application.

According to a first aspect of the embodiments of this application, a communication method is provided. The method is applied to a sending node, the sending node includes N light sources, and the method includes: generating N physical frames, where each of the physical frames includes a preamble, a mode indication, and valid data, the mode indication is used to indicate a sending mode of the N light sources, the sending mode is a diversity mode or a multiplexing mode, and N is a positive integer greater than or equal to 2; sending the N physical frames by using the N light sources, where one light source sends one physical frame. According to the communication method provided in the embodiments of this application, the mode indication is added to a frame structure of the physical frame, and the mode indication is used to indicate the sending mode of the N light sources, that is, a sending mode in which original data is sent by using the N light sources. In this way, transmission is simultaneously performed by using the N light sources and transmission efficiency is increased. Further, a receiving node parses the received physical frames based on the mode indication to obtain the original data.

It should be noted that a light source may be an LED or a laser diode (Laser Diode, LD). In the diversity mode, valid data sent by using all of the N light sources is the same.

With reference to the first aspect, in a possible implementation, if the sending mode that is of the N light sources and that is indicated by the mode indication is the multiplexing mode, each of the physical frames further includes a port indication. In this way, the receiving node parses the received physical frame based on the mode indication and the port indication, to obtain the original data. The port indication is used to indicate information about the N light sources used to send the valid data.

According to a second aspect of the embodiments of this application, a communication method is provided. The method is applied to a receiving node and includes: receiving P physical frames sent by using P light sources, where each of the physical frames includes a preamble, a mode indication, and valid data, the mode indication is used to indicate a sending mode of N light sources of a sending node, the sending mode is a diversity mode or a multiplexing mode, N is a positive integer greater than or equal to 2, and P is less than or equal to N; determining the sending mode of the N light sources of the sending node based on the mode indication; and if the sending mode that is of the N light sources and that is indicated by the mode indication is the diversity mode, obtaining, based on valid data of one or L physical frames in the P physical frames, original data sent by the sending node by using the N light sources, where L is less than or equal to P. According to the communication method provided in the embodiments of this application, the mode indication is added to a frame structure of the physical frame, and the mode indication is used to indicate the sending mode of the N light sources, that is, a sending mode in which the original data is sent by using the N light sources. In this way, transmission is simultaneously performed by using the N light sources and transmission efficiency is increased. Further, the receiving node parses the received physical frames based on the mode indication to obtain the original data.

With reference to the second aspect, in a possible implementation, if the sending mode that is of the N light sources and that is indicated by the mode indication is the multiplexing mode, each of the physical frames further includes a port indication, and the method further includes: determining whether P is equal to N; and if P is equal to N, parsing valid data of the P physical frames based on port indications of the P physical frames, to obtain the original data sent by the sending node by using the N light sources. In this way, the receiving node parses the received physical frames based on the mode indication and the port indication, to obtain the original data.

According to a third aspect of the embodiments of this application, a sending node is provided. The sending node includes N light sources and includes: a processing unit, configured to generate N physical frames, where each of the physical frames includes a preamble, a mode indication, and valid data, the mode indication is used to indicate a sending mode of the N light sources, the sending mode is a diversity mode or a multiplexing mode, and N is a positive integer greater than or equal to 2; and a sending unit, configured to send the N physical frames by using the N light sources, where one light source sends one physical frame.

With reference to the third aspect, in a possible implementation, if the sending mode that is of the N light sources and that is indicated by the mode indication is the multiplexing mode, each of the physical frames further includes a port indication.

According to a fourth aspect of the embodiments of this application, a receiving node is provided and includes: a receiving unit, configured to receive P physical frames sent by using P light sources, where each of the physical frames includes a preamble, a mode indication, and valid data, the mode indication is used to indicate a sending mode of N light sources of a sending node, the sending mode is a diversity mode or a multiplexing mode, N is a positive integer greater than or equal to 2, and P is less than or equal to N; and a processing unit, configured to determine the sending mode of the N light sources of the sending node based on the mode indication; where the processing unit is further configured to: if the sending mode that is of the N light sources and that is indicated by the mode indication is the diversity mode, obtain, based on valid data of one or L physical frames in the P physical frames, original data sent by the sending node by using the N light sources, where L is less than or equal to P.

With reference to the fourth aspect, in a possible implementation, if the sending mode that is of the N light sources and that is indicated by the mode indication is the multiplexing mode, each of the physical frames further includes a port indication; the processing unit is further configured to determine whether P is equal to N; and the processing unit is further configured to: if P is equal to N, parse valid data of the P physical frames based on port indications of the P physical frames, to obtain the original data sent by the sending node by using the N light sources.

With reference to the foregoing possible implementations, in another possible implementation, the preamble of each of the physical frames includes a symbol 0 to a symbol m+1, a duty cycle corresponding to the symbol 0 is a first duty cycle, a duty cycle corresponding to the symbol m+1 is a second duty cycle, duty cycles corresponding to m symbols from a symbol 1 to a symbol m one-to-one correspond to all m duty cycles used for m-order UPWM, and m is a modulation order used for the valid data included in the physical frame. It should be noted that, before the sending mode of the N light sources of the sending node is determined based on the mode indication, synchronization, phase error correction, and nonlinear compensation need to be performed on the received physical frame based on the preamble.

With reference to the foregoing possible implementations, in another possible implementation, the preamble of each of the physical frames includes a symbol 0, a symbol m+1, and one of T preamble blocks, a duty cycle corresponding to the symbol 0 is a first duty cycle, a duty cycle corresponding to the symbol m+1 is a second duty cycle, T is a quantity of groups of the N light sources, each of the T preamble blocks includes K symbols, duty cycles corresponding to the K symbols are some of all m duty cycles used for m-order UPWM, and duty cycles corresponding to K×T symbols included in the T preamble blocks include the m duty cycles, where T is a positive integer greater than or equal to 2, and K is an integer greater than or equal to 1 and less than or equal to m.

With reference to the foregoing possible implementations, in another possible implementation, before synchronization, phase error correction, and nonlinear compensation are performed on the received physical frame based on the preamble, preamble blocks included in all of the physical frames are combined to constitute the preamble.

With reference to the foregoing possible implementations, in another possible implementation, the mode indication of each of the physical frames includes a first symbol, if the sending mode that is of the N light sources and that is indicated by the mode indication is the diversity mode, a duty cycle corresponding to the first symbol is a third duty cycle, and if the sending mode that is of the N light sources and that is indicated by the mode indication is the multiplexing mode, the duty cycle corresponding to the first symbol is a fourth duty cycle.

With reference to the foregoing possible implementations, in another possible implementation, the mode indication of each of the physical frames includes a second symbol and a third symbol, second symbols of all of the physical frames correspond to a same duty cycle, and third symbols of all of the physical frames correspond to a same duty cycle; and if the sending mode that is of the N light sources and that is indicated by the mode indication is the diversity mode, the second symbol and the third symbol of each of the physical frames correspond to different duty cycles, and if the sending mode that is of the N light sources and that is indicated by the mode indication is the multiplexing mode, the second symbol and the third symbol of each of the physical frames correspond to a same duty cycle; or if the sending mode that is of the N light sources and that is indicated by the mode indication is the diversity mode, the second symbol and the third symbol of each of the physical frames correspond to a same duty cycle, and if the sending mode that is of the N light sources and that is indicated by the mode indication is the multiplexing mode, the second symbol and the third symbol of each of the physical frames correspond to different duty cycles.

With reference to the foregoing possible implementations, in another possible implementation, if the sending mode that is of the N light sources and that is indicated by the mode indication is the diversity mode, the valid data included in each of the physical frames includes to-be-sent original data, and if the sending mode that is of the N light sources and that is indicated by the mode indication is the multiplexing mode, the valid data included in each of the physical frames includes one data block, and the data block includes one Nth of the to-be-sent original data.

With reference to the foregoing possible implementations, in another possible implementation, the port indication includes a light source sum field and a first light source sequence number field, the light source sum field is used to indicate a quantity N of light sources used by the sending node to send the N physical frames, and the first light source sequence number field is used to indicate a sequence number of a light source used to send a current physical frame; the port indication includes a light source sum field, a first light source sequence number field, and a first check bit field; the port indication includes a first light source sequence number field and an $N^{th}$ light source indication field, and the $N^{th}$ light source indication field is used to indicate whether a light source indicated by the first light source sequence number field is an $N^{th}$ light source; the port indication includes a first light source sequence number field, an $N^{th}$ light source indication field, and a first check bit field; the port indication includes an extended indication field, an $N^{th}$ light source indication field, a second light source sequence number field, and a second check bit field; the port indication includes an extended indication field, an $N^{th}$ light source indication field, a second light source sequence number field, a second check bit field, a third light source sequence number field, and a third check bit field; the port indication includes Q symbols, the Q symbols are used to indicate a total quantity of light sources and a light source sequence number, the total quantity of light sources indicates a quantity N of light sources used by the sending node to send the N physical frames, and the light source sequence number indicates a sequence number of a light source used to send a current physical frame; or the port indication includes Q symbols, Q−1 symbols in the Q symbols are used to indicate the light source sequence number, and a symbol other than the Q−1 symbols in the Q symbols is used to indicate whether a light source indicated by the light source sequence number is an $N^{th}$ light source.

According to a fifth aspect of the embodiments of this application, a communication method is provided. The method is applied to a sending node, the sending node includes N light sources, and the method includes: generating N physical frames, where each of the physical frames includes a preamble and valid data, and N is a positive integer greater than or equal to 2; sending the N physical frames by using the N light sources, where one light source sends one physical frame; where the preamble includes a symbol 0 to a symbol m+1, a duty cycle corresponding to the symbol 0 is a first duty cycle, a duty cycle corresponding to the symbol m+1 is a second duty cycle, duty cycles corresponding to m symbols from a symbol 1 to a symbol m one-to-one correspond to all m duty cycles used for m-order UPWM, m is a modulation order used for the valid data included in the physical frame, different sequences of the symbols from the symbol 1 to the symbol m included in the preamble are used to indicate sending modes of the N light sources of the sending node, or different sequences of X1 symbols in the symbols from the symbol 1 to the symbol m included in the preamble are used to indicate sending modes, and the sending mode is a diversity mode or a multiplexing mode. According to the communication method provided in the embodiments of this application, the preamble is used to indicate the sending mode of the N light sources, that is, a sending mode in which original data is sent by using the N light sources. In this way, transmission is simultaneously performed by using the N light sources and transmission efficiency is increased. Further, a receiving node parses the received physical frames based on the preamble to obtain the original data.

With reference to the fifth aspect, in a possible implementation, if the sending mode indicated by the different sequences of the symbols from the symbol 1 to the symbol m included in the preamble is the multiplexing mode, each of the physical frames further includes a first port indication; or if the sending mode indicated by the different sequences of the X1 symbols in the symbols from the symbol 1 to the symbol m included in the preamble is the multiplexing mode, and when X2 symbols other than the X1 symbols in the symbols from the symbol 1 to the symbol m included in the preamble of each of the physical frames are used to indicate a light source sequence number, each of the physical frames further includes a second port indication, where X1+X2≤m, or X3 symbols other than the X1 symbols and the X2 symbols in the symbols from the symbol 1 to the symbol m included in the preamble are used to indicate a total quantity of light sources, where X1+X2+X3≤m. The light source sequence number indicates a sequence number of a light source used to send a current physical frame, and the total quantity of light sources indicates a quantity N of light sources used by the sending node to send the N physical frames.

According to a sixth aspect of the embodiments of this application, a communication method is provided. The method is applied to a receiving node and includes: receiving P physical frames sent by using P light sources, where each of the physical frames includes a preamble and valid data, the preamble includes a symbol 0 to a symbol m+1, a duty cycle corresponding to the symbol 0 is a first duty cycle a duty cycle corresponding to the symbol m+1 is a second duty cycle, duty cycles corresponding to m symbols from a symbol 1 to a symbol m one-to-one correspond to all m duty cycles used for m-order UPWM, m is a modulation order used for the valid data included in the physical frame, different sequences of the symbols from the symbol 1 to the symbol m included in the preamble are used to indicate sending modes of N light sources of a sending node, or different sequences of X1 symbols in the symbols from the symbol 1 to the symbol m included in the preamble are used to indicate sending modes, and the sending mode is a diversity mode or a multiplexing mode, where N is a positive integer greater than or equal to 2, and P is less than or equal to N; determining the sending mode of the N light sources of the sending node based on the preamble; and if the sending mode indicated by the preamble is the diversity mode, obtaining, based on valid data of one or L physical frames in the P physical frames, original data sent by the sending node by using the N light sources, where L is less than or equal to P. According to the communication method provided in the embodiments of this application, the preamble is used to indicate the sending mode of the N light sources, that is, a sending mode in which the original data is sent by using the N light sources. In this way, transmission is simultaneously performed by using the N light sources and transmission efficiency is increased. Further, the receiving node parses the received physical frames based on the preamble to obtain the original data.

With reference to the sixth aspect, in a possible implementation, if the sending mode indicated by the different sequences of the symbols from the symbol 1 to the symbol m included in the preamble is the multiplexing mode, each of the physical frames further includes a first port indication; or if the sending mode indicated by the different sequences of the X1 symbols in the symbols from the symbol 1 to the symbol m included in the preamble is the multiplexing mode, and when X2 symbols other than the X1 symbols in the symbols from the symbol 1 to the symbol m included in the preamble of each of the physical frames are used to indicate a light source sequence number, each of the physical frames further includes a second port indication, where X1+X2≤m, or X3 symbols other than the X1 symbols and the X2 symbols in the symbols from the symbol 1 to the symbol m included in the preamble are used to indicate a total quantity of light sources, where X1+X2+X3≤m. The light source sequence number indicates a sequence number of a light source used to send a current physical frame, and the total quantity of light sources indicates a quantity N of light sources used by the sending node to send N physical frames. The method further includes: determining whether P is equal to N; and if P is equal to N, parsing valid data of the P physical frames based on preambles and/or port indications of the P physical frames, to obtain the original data sent by the sending node by using the N light sources, where the port indication includes the first port indication or the second port indication. In this way, the receiving node parses the received physical frames based on the preamble and the port indication, to obtain the original data.

According to a seventh aspect of the embodiments of this application, a sending node is provided. The sending node includes N light sources and includes: a processing unit, configured to generate N physical frames, where each of the physical frames includes a preamble and valid data, and N is a positive integer greater than or equal to 2; and a sending unit, configured to send the N physical frames by using the N light sources, where one light source sends one physical frame. The preamble includes a symbol 0 to a symbol m+1, a duty cycle corresponding to the symbol 0 is a first duty cycle, a duty cycle corresponding to the symbol m+1 is a second duty cycle, duty cycles corresponding to m symbols from a symbol 1 to a symbol m one-to-one correspond to all m duty cycles used for m-order UPWM, m is a modulation order used for the valid data included in the physical frame, different sequences of the symbols from the symbol 1 to the symbol m included in the preamble are used to indicate sending modes of the N light sources of the sending node, or different sequences of X1 symbols in the symbols from the symbol 1 to the symbol m included in the preamble are used to indicate sending modes, and the sending mode is a diversity mode or a multiplexing mode.

With reference to the seventh aspect, in a possible implementation, if the sending mode indicated by the different sequences of the symbols from the symbol 1 to the symbol m included in the preamble is the multiplexing mode, each of the physical frames further includes a first port indication; or if the sending mode indicated by the different sequences of the X1 symbols in the symbols from the symbol 1 to the symbol m included in the preamble is the multiplexing mode, and when X2 symbols other than the X1 symbols in the symbols from the symbol 1 to the symbol m included in the preamble of each of the physical frames are used to indicate a light source sequence number, each of the physical frames further includes a second port indication, where X1+X2≤m, or X3 symbols other than the X1 symbols and the X2 symbols in the symbols from the symbol 1 to the symbol m included in the preamble are used to indicate a total quantity of light sources, where X1+X2+X3≤m. The light source sequence number indicates a sequence number of a light source used to send a current physical frame, and the total quantity of light sources indicates a quantity N of light sources used by the sending node to send the N physical frames.

According to an eighth aspect of the embodiments of this application, a receiving node is provided and includes: a receiving unit, configured to receive P physical frames sent by using P light sources, where each of the physical frames includes a preamble and valid data, the preamble includes a symbol 0 to a symbol m+1, a duty cycle corresponding to the symbol 0 is a first duty cycle, a duty cycle corresponding to the symbol m+1 is a second duty cycle, duty cycles corresponding to m symbols from a symbol 1 to a symbol m one-to-one correspond to all m duty cycles used for m-order UPWM, m is a modulation order used for the valid data included in the physical frame, different sequences of the symbols from the symbol 1 to the symbol m included in the preamble are used to indicate sending modes of N light sources of a sending node, or different sequences of X1 symbols in the symbols from the symbol 1 to the symbol m included in the preamble are used to indicate sending modes, and the sending mode is a diversity mode or a multiplexing mode, where N is a positive integer greater than or equal to 2, and P is less than or equal to N; and a processing unit, configured to determine the sending mode of the N light sources of the sending node based on the preamble; where the processing unit is further configured to: if the sending mode indicated by the preamble is the diversity mode, obtain, based on valid data of one or L physical frames in the P physical frames, original data sent by the sending node by using the N light sources, where L is less than or equal to P.

With reference to the eighth aspect, in a possible implementation, if the sending mode indicated by the different sequences of the symbols from the symbol 1 to the symbol m included in the preamble is the multiplexing mode, each of the physical frames further includes a first port indication; or if the sending mode indicated by the different sequences of the X1 symbols in the symbols from the symbol 1 to the symbol m included in the preamble is the multiplexing mode, and when X2 symbols other than the X1 symbols in the symbols from the symbol 1 to the symbol m included in the preamble of each of the physical frames are used to indicate a light source sequence number, each of the physical frames further includes a second port indication, where X1+X2≤m, or X3 symbols other than the X1 symbols and the X2 symbols in the symbols from the symbol 1 to the symbol m included in the preamble are used to indicate a total quantity of light sources, where X1+X2+X3≤m. The light source sequence number indicates a sequence number of a light source used to send a current physical frame, and the total quantity of light sources indicates a quantity N of light sources used by the sending node to send N physical frames. The processing unit is further configured to determine whether P is equal to N; and the processing unit is further configured to: if P is equal to N, parse valid data of the P physical frames based on preambles and/or port indications of the P physical frames, to obtain the original data sent by the sending node by using the N light sources, where the port indication includes the first port indication or the second port indication.

With reference to the foregoing possible implementations, in another possible implementation, when the symbols from the symbol 1 to the symbol in are sorted in descending order, the sending mode is the diversity mode, and when the symbols from the symbol 1 to the symbol m are sorted in ascending order, the sending mode is the multiplexing mode; or when the symbols from the symbol 1 to the symbol m are sorted in ascending order, the sending mode is the diversity mode, and when the symbols from the symbol 1 to the symbol n are sorted in descending order, the sending mode is the multiplexing mode.

With reference to the foregoing possible implementations, in another possible implementation, the first port indication includes a light source sum field and a first light source sequence number field, the light source sum field is used to indicate a quantity N of light sources used by the sending node to send the N physical frames, and the first light source sequence number field is used to indicate a sequence number of a light source used to send a current physical frame; the first port indication includes a light source sum field, a first light source sequence number field, and a first check bit field; the first port indication includes a first light source sequence number field and an $N^{th}$ light source indication field, and the $N^{th}$ light source indication field is used to indicate whether a light source indicated by the first light source sequence number field is an $N^{th}$ light source; the first port indication includes a first light source sequence number field, an $N^{th}$ light source indication field, and a first check bit field; the first port indication includes an extended indication field, an $N^{th}$ light source indication field, a second light source sequence number field, and a second check bit field; the first port indication includes an extended indication field, an $N^{th}$ light source indication field, a second light source sequence number field, a second check bit field, a third light source sequence number field, and a third check bit field; the first port indication includes Q symbols, the Q symbols are used to indicate the total quantity of light sources and the light source sequence number, the total quantity of light sources indicates a quantity N of light sources used by the sending node to send the N physical frames, and the light source sequence number indicates a sequence number of a light source used to send a current physical frame; or the first port indication includes Q symbols, Q−1 symbols in the Q symbols are used to indicate the light source sequence number, and a symbol other than the Q−1 symbols in the Q symbols is used to indicate whether a light source indicated by the light source sequence number is an $N^{th}$ light source.

With reference to the foregoing possible implementations, in another possible implementation, the second port indication includes a light source sum field, and the light source sum field is used to indicate a quantity N of light sources used by the sending node to send the N physical frames; or the second port indication includes a light source sum field and a fourth check bit field; or the second port indication includes R symbols, and the R symbols are used to indicate the total quantity of light sources or indicate whether a light source indicated by the light source sequence number is an $N^{th}$ light source.

It should be noted that the functional modules in the third aspect, the fourth aspect, the seventh aspect, and the eighth aspect may be implemented by hardware, or may be implemented by hardware by executing corresponding software. The hardware or software includes one or more modules corresponding to the foregoing functions. For example, a transceiver is configured to complete functions of the receiving unit and the sending unit, a processor is configured to complete functions of the processing unit, and a memory is configured to store a program instruction of the communication method in the embodiments of this application. The processor, the transceiver, and the memory are connected and communicate with each other by using a bus. For details, refer to functions of behaviors of the sending node in the communication methods provided in the first aspect and the fifth aspect, and functions of behaviors of the receiving node in the communication methods provided in the second aspect and the sixth aspect.

According to a ninth aspect of the embodiments of this application, a sending node is provided and includes a processor, a memory, a bus, and a communications interface. The memory is configured to store a computer executable instruction. The processor and the memory are connected by using the bus. When the processor executes the computer execution instruction stored in the memory, the sending node is enabled to perform the method according to any one of the foregoing aspects, the processor executes the computer executable instruction stored in the memory, so that the sending node performs the method according to any one of the foregoing aspects.

According to a tenth aspect of the embodiments of this application, a receiving node is provided and includes a processor, a memory, a bus, and a communications interface. The memory is configured to store a computer executable instruction. The processor and the memory are connected by using the bus. When the processor executes the computer execution instruction stored in the memory, the sending node is enabled to perform the method according to any one of the foregoing aspects, the processor executes the computer executable instruction stored in the memory, so that the receiving node performs the method according to any one of the foregoing aspects.

According to an eleventh aspect of the embodiments of this application, a computer-readable storage medium is provided and includes a computer software instruction. When the computer software instruction is run on a sending node or a chip built in a sending node, the sending node is enabled to perform the foregoing communication method.

According to a twelfth aspect of the embodiments of this application, a computer-readable storage medium is provided and includes a computer software instruction. When the computer software instruction is run on a receiving node or a chip built in a receiving node, the receiving node is enabled to perform the foregoing communication method.

According to a thirteenth aspect of the embodiments of this application, a computer program product including an instruction is provided. When the computer program product is run on a sending node or a chip built in a sending node, the sending node is enabled to perform the foregoing communication method.

According to a fourteenth aspect of the embodiments of this application, a computer program product including an instruction is provided. When the computer program product is run on a receiving node or a chip built in a receiving node, the receiving node is enabled to perform the foregoing communication method.

In addition, for technical effects brought by the designs of any one of the foregoing aspects, refer to technical effects brought by different designs of the first aspect and the fifth aspect. Details are not described herein.

In the embodiments of this application, names of the sending node and the receiving node constitute no limitation on devices. During actual implementation, these devices may have other names, provided that functions of each device are similar to those in the embodiments of this application and fall within the scope of the claims of this application and their equivalent technologies.

DESCRIPTION OF EMBODIMENTS

A communication method provided in the embodiments of this application may be applied to a plurality of communications systems, for example, an optical camera communications (Optical Camera Communications. OCC) system.

Figure 1:
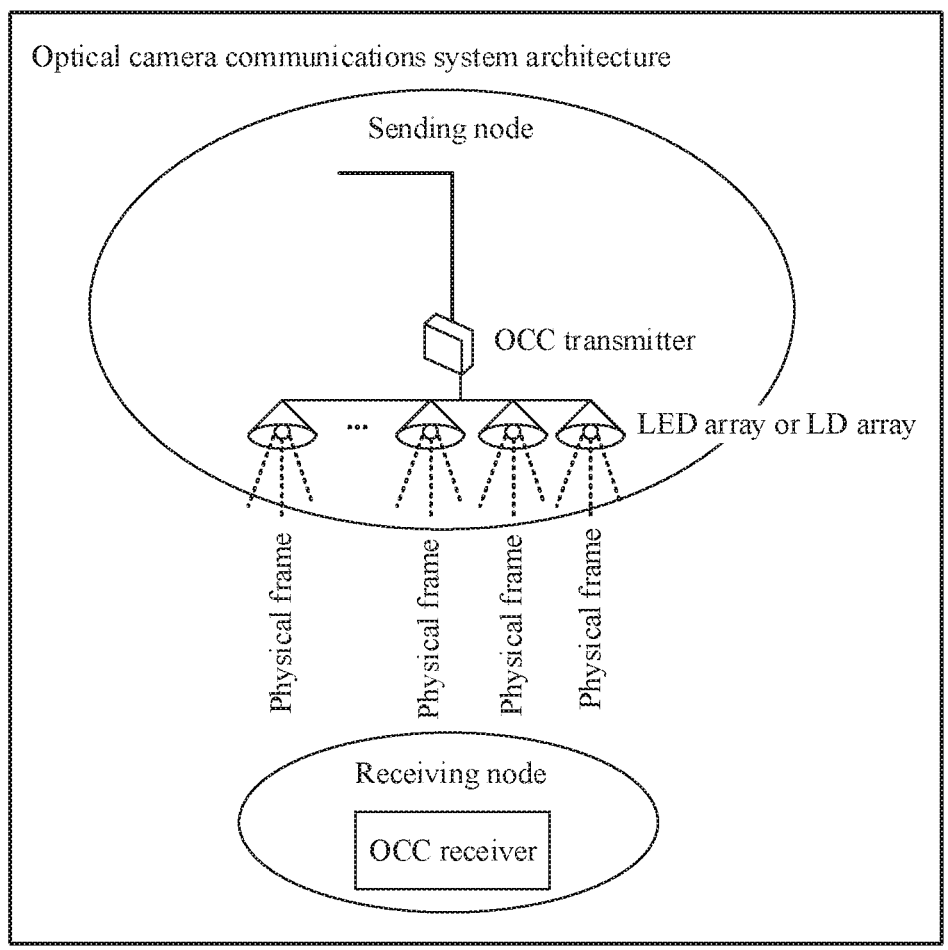
FIG. 1 is a schematic architectural diagram of an optical camera communications system according to an embodiment of this application.

FIG. 1 is a schematic architectural diagram of an optical camera communications system according to an embodiment of this application. The system includes a sending node and a receiving node. The sending node includes at least an OCC transmitter. The OCC transmitter is configured with an LED array or an LD array, and may be a lighting fitting, a front lamp or a rear lamp of a car, a traffic signal lamp, or the like that has an OCC function. The receiving node includes at least an OCC receiver. For example, the OCC receiver may be a smartphone, a tablet computer, a surveillance camera, a dashcam, or the like configured with a built-in camera that has the OCC function. It should be noted that a global shutter (Global Shutter, GS) exposure mode or a rolling shutter (Rolling Shutter, RS) exposure mode may be used for the built-in camera in this embodiment of this application.

The communication method provided in the embodiments of this application is applied to the sending node and the receiving node. The sending node includes N light sources, and the method includes: generating, by the sending node, N physical frames, where each of the physical frames includes a preamble, a mode indication, and valid data, the mode indication is used to indicate a sending mode of the N light sources, the sending mode is a diversity mode or a multiplexing mode, and N is a positive integer greater than or equal to 2; sending, by the sending node, the N physical frames by using the N light sources, where one light source sends one physical frame; receiving, by the receiving node, P physical frames sent by using P light sources; determining the sending mode of the N light sources of the sending node based on the mode indication; and if the sending mode that is of the N light sources and that is indicated by the mode indication is the diversity mode, obtaining, based on valid data of one or L physical frames in the P physical frames, original data sent by the sending node by using the N light sources. According to the communication method provided in the embodiments of this application, the mode indication is added to a frame structure of the physical frame, and the mode indication is used to indicate the sending mode of the N light sources, that is, a sending mode in which the original data is sent by using the N light sources. In this way, transmission is simultaneously performed by using the N light sources and transmission efficiency is increased. Further, the receiving node parses the received physical frames based on the mode indication to obtain the original data.

It should be noted that, to facilitate clear description of the technical solutions in the embodiments of this application, words such as "first" and "second" are used in the embodiments of this application to distinguish same items or similar items that provide basically same functions. A person skilled in the art may understand that the words such as "first" and "second" do not limit a quantity and an execution sequence.

The following describes the implementations of the embodiments of this application in detail with reference to the accompanying drawings.

Figure 2:
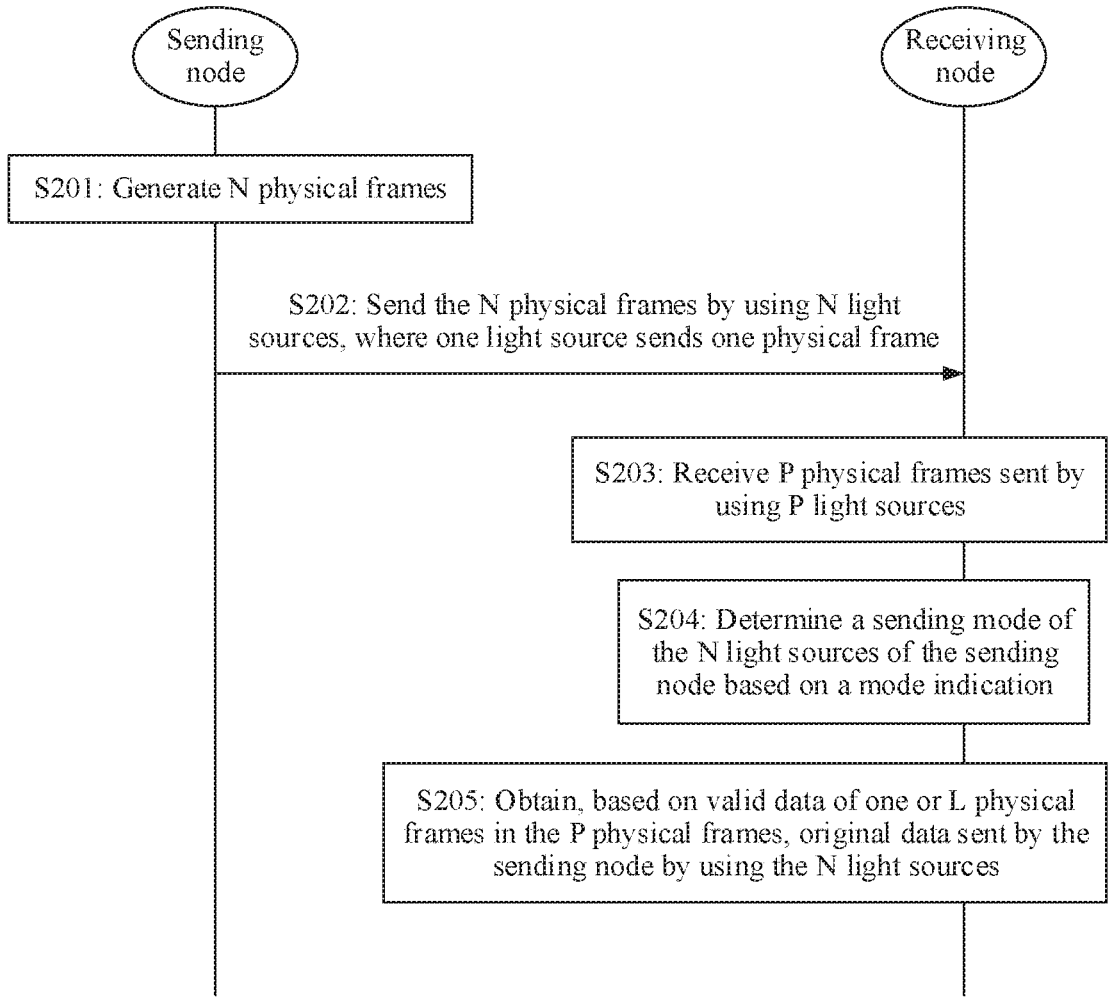
FIG. 2 is a flowchart of a communication method according to an embodiment of this application.

FIG. 2 is a flowchart of a communication method according to an embodiment of this application. A sending node includes N light sources. As shown in FIG. 2, the method may include the following steps.

S201: The sending node generates N physical frames.

Figure 3:
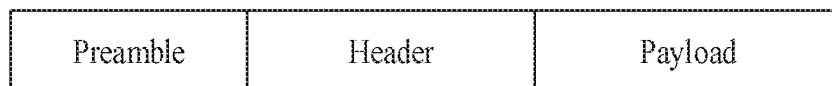
FIG. 3 is a schematic structural diagram of a physical frame according to the prior art.

In the prior art, when a sending node of an optical camera communications system includes one LED or one LD, a physical frame (PHY frame) sent by the sending node usually includes a preamble (preamble), a header (header), and a payload (payload), as shown in FIG. 3.

Figure 4:
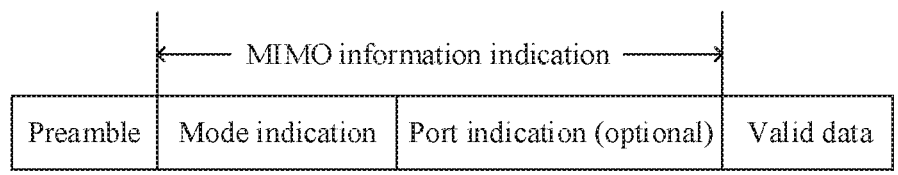
FIG. 4 is a schematic structural diagram of a physical frame according to an embodiment of this application.

In this embodiment of this application, for a scenario in which the sending node of the optical camera communications system includes an LED array or an LD array, that is, a scenario of a plurality of light sources, each of the N physical frames includes a preamble, a mode indication, and valid data. FIG. 4 is a schematic structural diagram of a physical frame according to an embodiment of this application. A port indication is an optional field of the physical frame. A mode indication and a port indication constitute a multiple-input multiple-output (Multiple-Input Multiple-Output, MIMO) information indication. The following separately describes in detail formats of a preamble, the mode indication, the port indication, and valid data that are included in the physical frame in this embodiment of this application.

Figure 5:
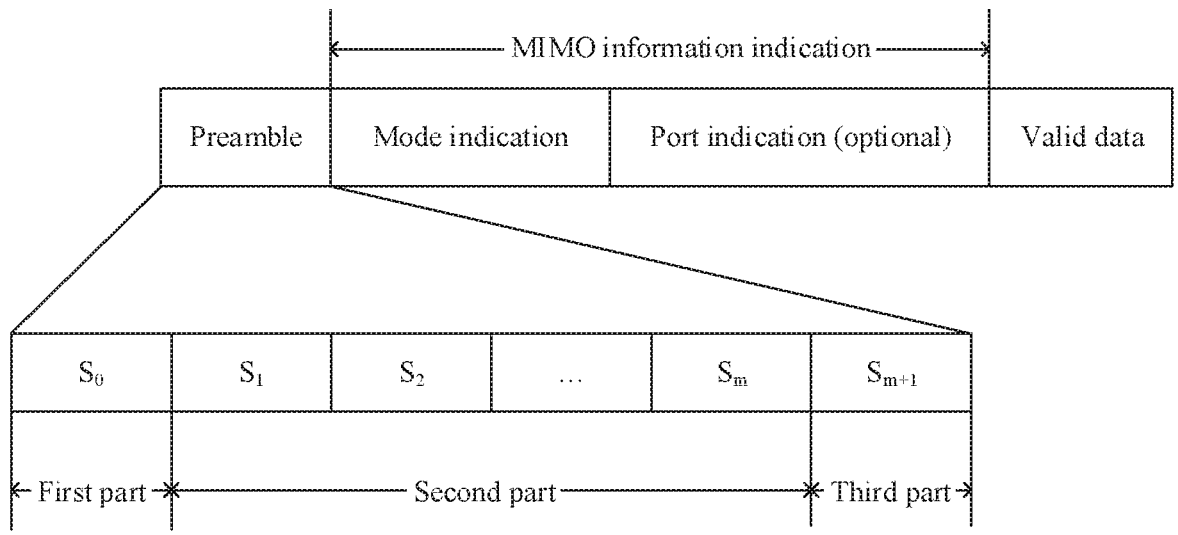
FIG. 5 is a schematic structural diagram of a preamble according to an embodiment of this application.

In a possible implementation, a preamble of each physical frame includes m+2 UPWM symbols, and is used for synchronization, phase error correction, and nonlinear compensation. The m+2 UPWM symbols include a symbol 0 to a symbol m+1, and m is a modulation order used for a header and a payload of the physical frame. A duty cycle corresponding to the symbol 0 is a first duty cycle, a duty cycle corresponding to the symbol m+1 is a second duty cycle, and duty cycles corresponding to m symbols from a symbol 1 to a symbol m one-to-one correspond to all m duty cycles used for m-order UPWM. The first duty cycle may be 0%, and the second duty cycle may be 100%. As shown in FIG. 5, $S_0$ indicates a symbol 0, $S_1$ to $S_m$ indicate a symbol 1 to a symbol m, and $S_{m+1}$ indicates a symbol m+1, where m is a positive integer, and a value of m may be an integer power of 2, for example, 2, 4, 8, or 16, or may be a non-integer power of 2, for example, 3, 6, 12, or 23.

In another possible implementation, a preamble of each physical frame includes a symbol 0, a symbol m+1, and one of T preamble blocks. A duty cycle corresponding to the symbol 0 is a first duty cycle, a duty cycle corresponding to the symbol m+1 is a second duty cycle, and T is a quantity of groups of N light sources. Each of the T preamble blocks includes K symbols, and duty cycles corresponding to the K symbols are some of all m duty cycles used for the m-order UPWM. Duty cycles corresponding to K×T symbols included in the T preamble blocks include the m duty cycles, where T is a positive integer greater than or equal to 2, and K is an integer greater than or equal to 1 and less than or equal to m. It should be noted that a manner of grouping the light sources and a manner of grouping the second part of the preamble are not specifically limited in this embodiment of this application.

For example, it is assumed that T=2, and the N light sources are classified into two groups. For example, the light sources are grouped based on an even light source sequence number and an odd light source sequence number. To be specific, a light source with an even number sequence number is classified as one group, and a light source with an odd number sequence number classified as one group. The first half part of the symbols $S_1$ to $S_m$ is a group, and the second half part of the symbols $S_1$ to $S_m$ is a group. A preamble sent by using the light source with the even number sequence number includes $S_0$, the first half part of the symbols $S_1$ to $S_m$, and $S_{m+1}$. A preamble sent by using the light source with the odd number sequence number includes $S_0$, the second half part of the symbols $S_1$ to $S_m$, and $S_{m+1}$. It should be noted that when m is an even number, the first half part of the symbols $S_1$ to $S_m$ refers to $S_1$ to $S_{m/2}$, and the second half part of the symbols $S_1$ to $S_m$ refers to $S_{(m/2+1)}$ to $S_m$. When m is an odd number, the first half part of the symbols $S_1$ to $S_m$ refers to $S_1$ to $S_{(m+1)/2}$, and the second half part of the symbols $S_1$ to $S_m$ refers to $S_{(m+1)/2}$ to $S_m$.

Optionally, it is assumed that T=2, and the N light sources are classified into two groups. For example, the light sources are grouped based on an even light source sequence number and an odd light source sequence number. To be specific, a light source with an even number sequence number is classified as one group, and a light source with an odd number sequence number is classified as one group. When m is an even number, symbols with odd number sequence numbers in the symbols $S_1$ to $S_m$ belong to one group, and symbols with even number sequence numbers in the symbols $S_1$ to $S_m$ belong to one group. A preamble sent by using the light source of the even number sequence number includes $S_0, S_1, S_3, \ldots, S_{m-1}$, and $S_{m+1}$, and a preamble sent by using the light source of the odd number sequence number includes $S_0, S_2, S_4, \ldots, S_m$, and $S_{m+1}$. When m is an odd number symbols $S_1$ to $S_{m-1}$ in the symbols $S_1$ to $S_m$ are grouped, where symbols with odd number sequence numbers are classified as one group, and symbols with even number sequence numbers are classified as one group. A preamble sent by using the light source of the even number sequence number includes $S_0, S_1, S_3, \ldots, S_{m-2}, S_m$, and $S_{m+1}$, and a preamble sent by using the light source of the odd number sequence number includes $S_0, S_2, S_4, \ldots, S_{m-1}$, $S_m$, and $S_{m+1}$.

The mode indication is used to indicate the sending mode of the N light sources, that is, a sending mode of sending physical frames by using the N light sources. The sending mode is a diversity mode or a multiplexing mode. In the diversity mode, valid data sent by using all of the N light sources is the same. It may be understood as that the physical frames sent by using all of the light sources each include all original data. In the multiplexing mode, valid data sent by using all of the N light sources is different. It may be understood as that the physical frame sent by using each of the light sources includes a part of the original data. For example, to-be-sent original data is divided into N parts based on a quantity N of light sources of the sending node, to obtain N data blocks, and the N data blocks are respectively mapped to the valid data of the N physical frames. If one Nth of a data length of the original data is not an integer multiple of N, 0 or 1 is added, where N is a positive integer greater than or equal to 2. Optionally, the original data is mapped to the N light sources bit by bit, and this is successively and cyclically performed. When the original data is original data sent when the sending node in the optical camera communications system includes one LED or one LD, the original data is a header and a payload in the physical frame sent by the sending node, where the payload is optional, and some physical frames include only a header and do not include a payload.

In a possible implementation, the mode indication of each physical frame includes a first symbol, if the sending mode that is of the N light sources and that is indicated by the mode indication is the diversity mode, a duty cycle corresponding to the first symbol is a third duty cycle, and if the sending mode that is of the N light sources and that is indicated by the mode indication is the multiplexing mode, the duty cycle corresponding to the first symbol is a fourth duty cycle. The third duty cycle and the fourth duty cycle may be two complementary duty cycles. For example, the third duty cycle is X % and the fourth duty cycle is 1−X %, or the third duty cycle is 1−X % and the fourth duty cycle is X %, where X % may be 0%, and 1−X % may be 100%.

In another possible implementation, the mode indication of each physical frame includes a second symbol and a third symbol, second symbols of all of the physical frames correspond to a same duty cycle, and third symbols of all of the physical frames correspond to a same duty cycle. If the sending mode that is of the N light sources and that is indicated by the mode indication is the diversity mode, the second symbol and the third symbol of each physical frame correspond to different duty cycles, and if the sending mode that is of the N light sources and that is indicated by the mode indication is the multiplexing mode, the second symbol and the third symbol of each physical frame correspond to a same duty cycle, as shown in Table 1.

TABLE 1

| Mode | Second symbol | Third symbol | Port indication |
|---|---|---|---|
| Multiplexing mode | For all light sources, X % (or 1 −X %) is used. | For all light sources, X % (or 1 −X %) is used. | Indication |
| Diversity mode | For all light sources, X % (or 1 −X %) is used. | For all light sources, 1 −X % (or X %) is used. | No indication |

X % may be 0%, and 1 −X % may be 100%.

Optionally, if the sending mode that is of the N light sources and that is indicated by the mode indication is the diversity mode, the second symbol and the third symbol of each physical frame correspond to a same duty cycle, and if the sending mode that is of the N light sources and that is indicated by the mode indication is the multiplexing mode, the second symbol and the third symbol of each physical frame correspond to different duty cycles.

Further, if the sending mode that is of the N light sources and that is indicated by the mode indication is the multiplexing mode, each physical frame further includes a port indication. In this way, a receiving node parses the received physical frames based on the mode indication and the port indication, to obtain the original data. The port indication is used to indicate information about the N light sources used to send the valid data.

Figure 6:
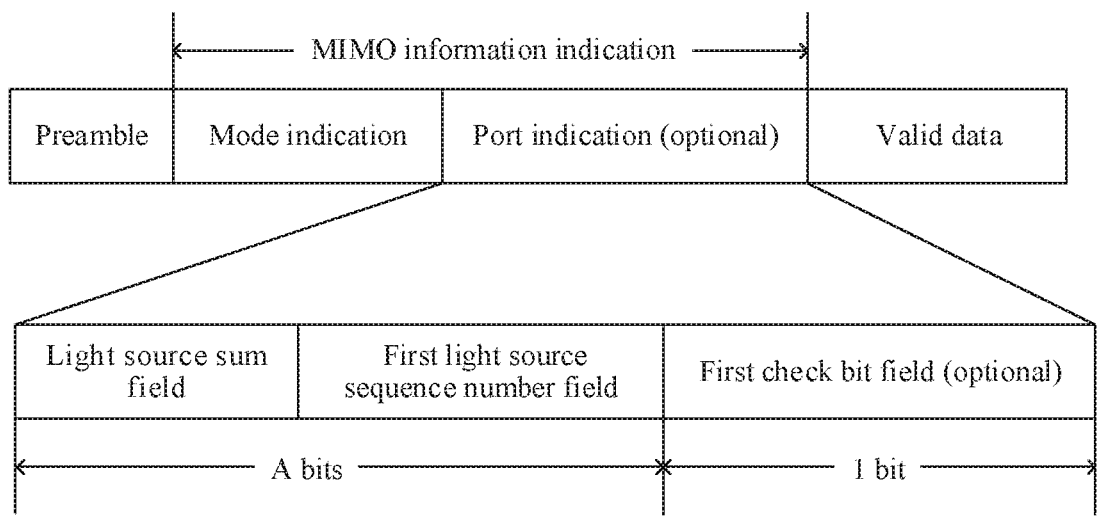
FIG. 6 is a schematic structural diagram of a port indication according to an embodiment of this application.

For example, FIG. 6 is a schematic structural diagram of a port indication according to an embodiment of this application. The port indication includes a light source sum field (LED Num) and a first light source sequence number field (Port ID). Optionally, the port indication further includes a first check bit field. The light source sum field is used to indicate a quantity N of light sources used by the sending node to send the N physical frames. In actual application, a quantity of bits of the light source sum field may be set based on a quantity N of light sources that expects to be supported. The first light source sequence number field is used to indicate a sequence number of a light source used to send a current physical frame. For example, when N=4, it indicates the sending node has four light sources, a sequence number of a first light source is 1, a sequence number of a second light source is 2, a sequence number of a third light source is 3, and a sequence number of a fourth light source is 4. In actual application, a quantity of bits of the first light source sequence number field may be set based on the quantity N of light sources that expects to be supported. The first check bit field is used to check the light source sum field and the first light source sequence number field. A parity check method, a cyclic redundancy check (Cyclic Redundancy Check, CRC) method, or the like may be used. This is not limited in this embodiment of this application.

Figure 7:
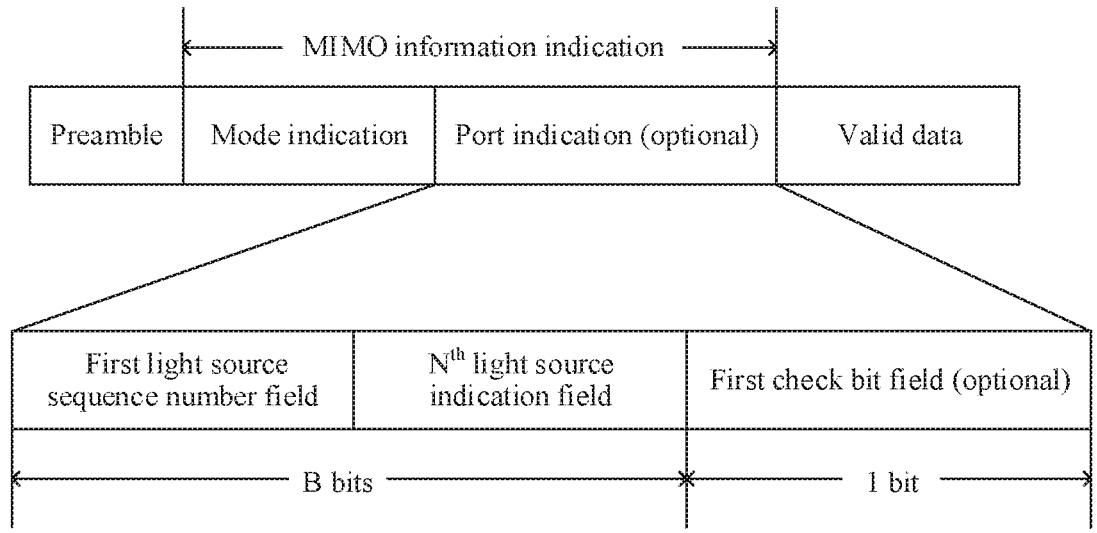
FIG. 7 is a schematic structural diagram of another port indication according to an embodiment of this application.

FIG. 7 is a schematic structural diagram of another port indication according to an embodiment of this application. The port indication includes a first light source sequence number field and an $N^{th}$ light source indication field. Optionally, the port indication further includes a first check bit field. The $N^{th}$ light source indication field is used to indicate whether a light source indicated by the first light source sequence number field is an $N^{th}$ light source. The $N^{th}$ light source may be a light source whose light source sequence number is equal to N. For example, when a total quantity of light sources is 16, light source sequence numbers of the N light sources are respectively 1 to 16, and the $N^{th}$ light source is a light source whose light source sequence number is 16. If the light source indicated by the first light source sequence number field is the $N^{th}$ light source, the $N^{th}$ light source indication field may be set to 1. If the light source indicated by the first light source sequence number field is not the $N^{th}$ light source, the $N^{th}$ light source indication field may be set to 0. The first check bit field is used to check the first light source sequence number field and the $N^{th}$ light source indication field.

Figure 8:
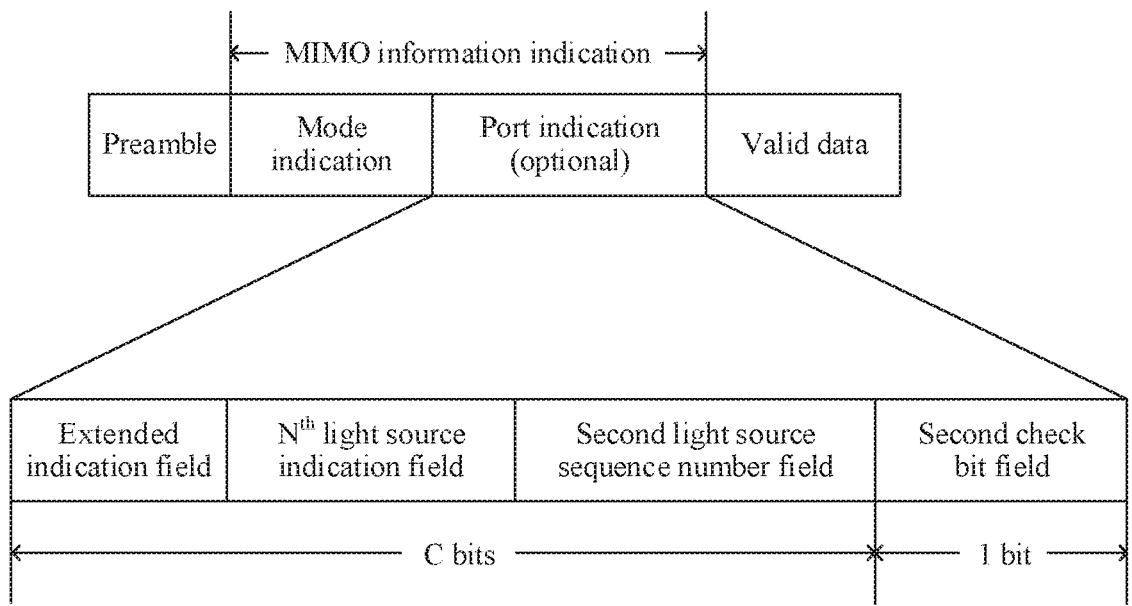
FIG. 8 is a schematic structural diagram of still another port indication according to an embodiment of this application.

FIG. 8 is a schematic structural diagram of still another port indication according to an embodiment of this application. The port indication includes an extended indication field, an $N^{th}$ light source indication field, a second light source sequence number field, and a second check bit field.

Figure 9:
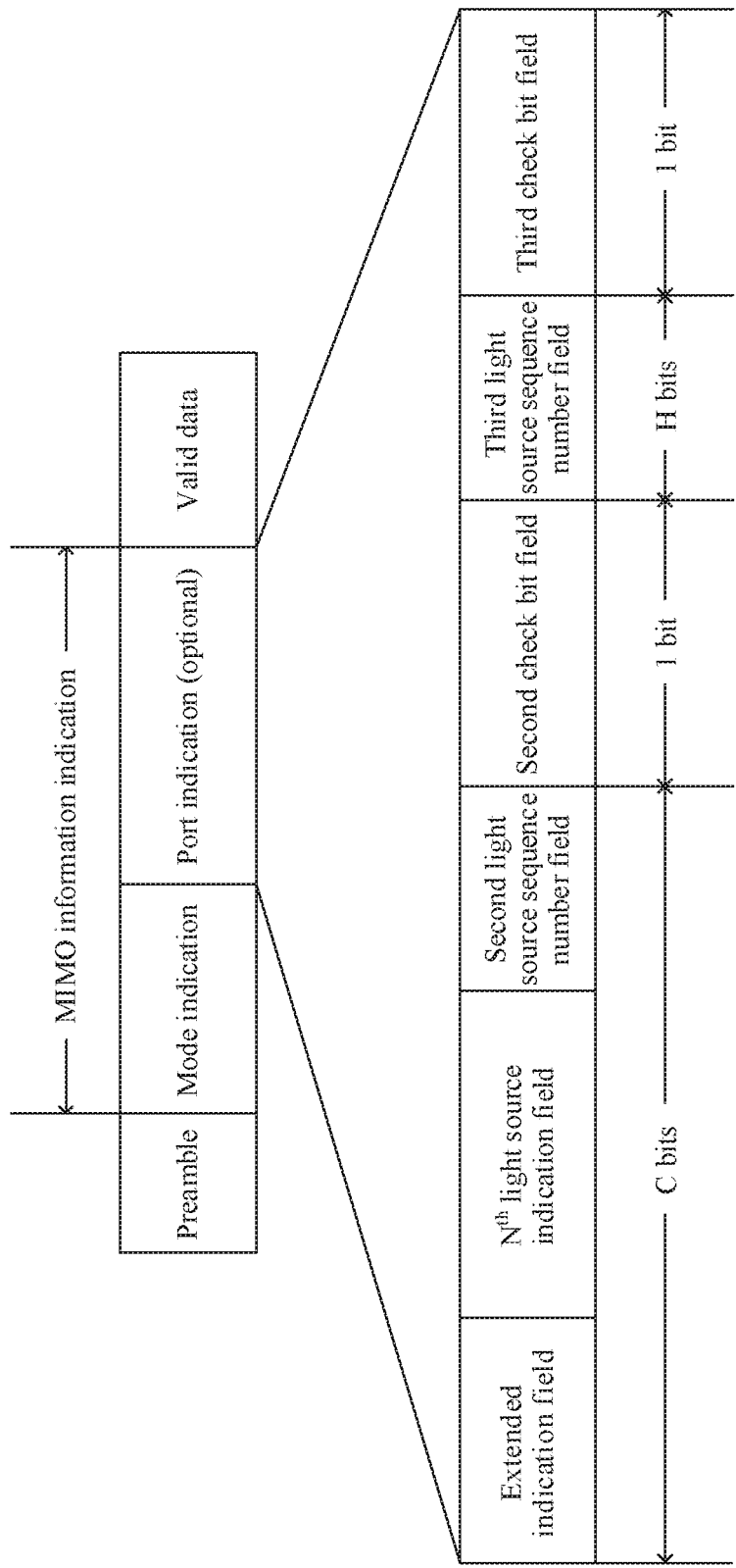
FIG. 9 is a schematic structural diagram of yet another port indication according to an embodiment of this application.

FIG. 9 is a schematic structural diagram of yet another port indication according to an embodiment of this application. The port indication includes an extended indication field, an $N^{th}$ light source indication field, a second light source sequence number field, a second check bit field, a third light source sequence number field, and a third check bit field.

For example, meanings of fields in the port indications in FIG. 8 and FIG. 9 are shown in Table 2.

TABLE 2

| | Field | Octet (byte) | Bit sequence number | Description |
|---|---|---|---|---|
| Common part | Extended indication field | 0 | [0] | If the port indication does not include an extended part, the extended indication field is set to 0. If the port indication includes an extended part, the extended indication field is set to 1. |
| | $N^{th}$ light source indication field | | [1] | If a light source indicated by the second light source sequence number field is not an $N^{th}$ light source, the $N^{th}$ light source indication field may be set to 0. If a light source indicated by the second light source sequence number field is an $N^{th}$ light source, the $N^{th}$ light source indication field may be set to 1. The second light source sequence number field may also indicate a total quantity of light sources. |
| | Second light source sequence number field | | [6:2] | If the extended indication field is set to 0, the second light source sequence number field is a light source sequence number. If the extended indication field is set to 1, the second light source sequence number field is a first part of a light source sequence number. |

TABLE 2-continued

| | Field | Octet (byte) | Bit sequence number | Description |
|---|---|---|---|---|
| | Second check bit field | | [7] | Check bit of the common part |
| Extended part | Third light source sequence number field | 1 | [6:0] | If the extended indication field is set to 0, the third light source sequence number field does not exist. If the extended indication field is set to 1, the third light source sequence number field is a second part of a light source sequence number. |
| | Third check bit field | | [7] | If the extended indication field is set to 0, the third check bit field does not exist. If the extended indication field is set to 1, the third check bit field is a check bit of the extended part. |

It should be noted that, if the extended indication field is set to 0, in this case, the second light source sequence number field is the same as the first light source sequence number field, and a complete sequence number of a light source is filled in. The extended indication field may occupy one bit, the $N^{th}$ light source indication field may occupy one bit, the second light source sequence number field may occupy five bits, the second check bit field may occupy one bit, the third light source sequence number field may occupy seven bits, and the second check bit field may occupy one bit.

Figure 10:
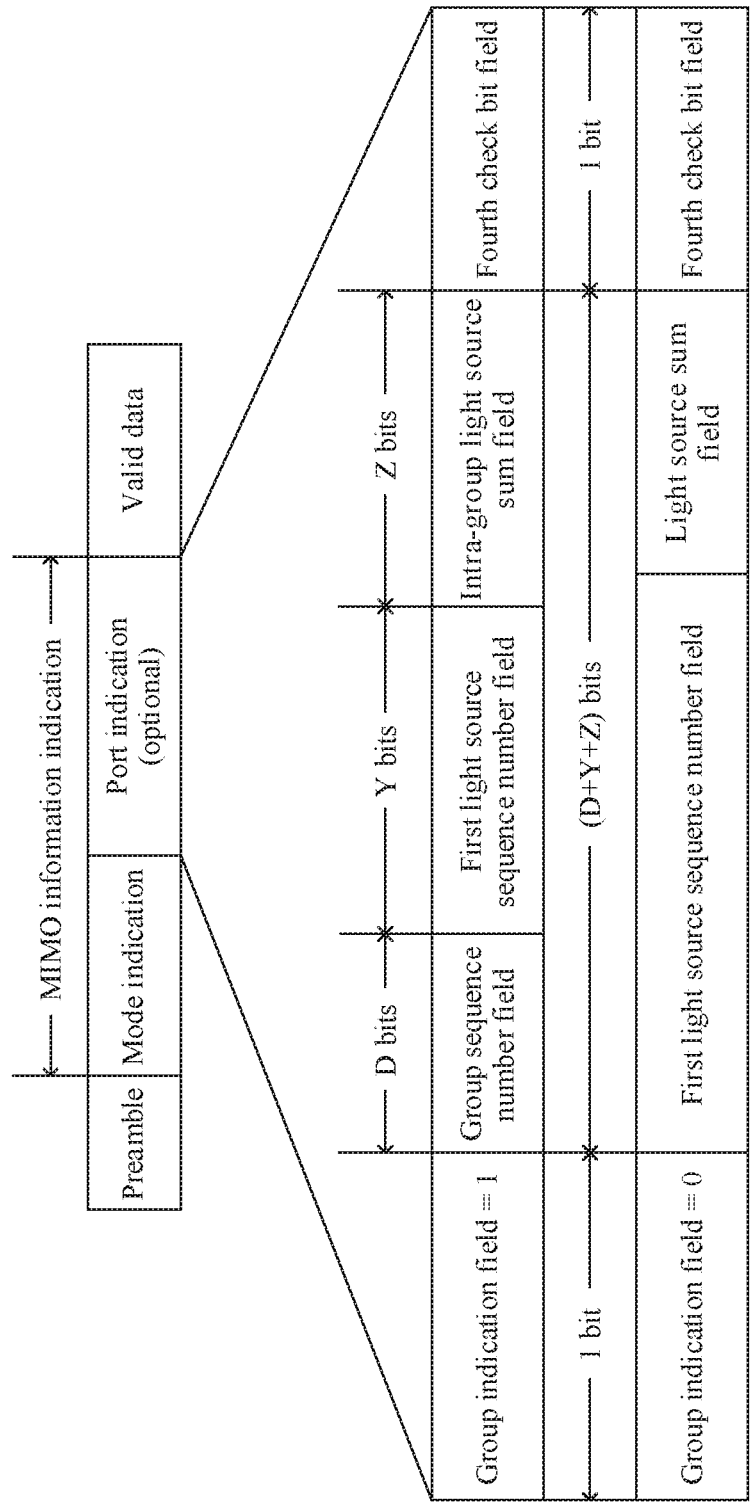
FIG. 10 is a schematic structural diagram of still yet another port indication according to an embodiment of this application.

FIG. 10 is a schematic structural diagram of still yet another port indication according to an embodiment of this application. The port indication includes a group indication field, a group sequence number field, a first light source sequence number field, an intra-group light source sum field, and a fourth check bit field. The group indication field is used to indicate whether the N light sources are grouped. If the N light sources are grouped, the group indication field may be set to 1. In addition, the group sequence number field is used to indicate a sequence number of a group, and each group has a sequence number. The intra-group light source sum field is used to indicate a quantity of light sources included in a group. If the N light sources are not grouped, the group indication field may be set to 0. The port indication includes the group indication field, the first light source sequence number field, the intra-group light source sum field, and the fourth check bit field.

Figure 11:
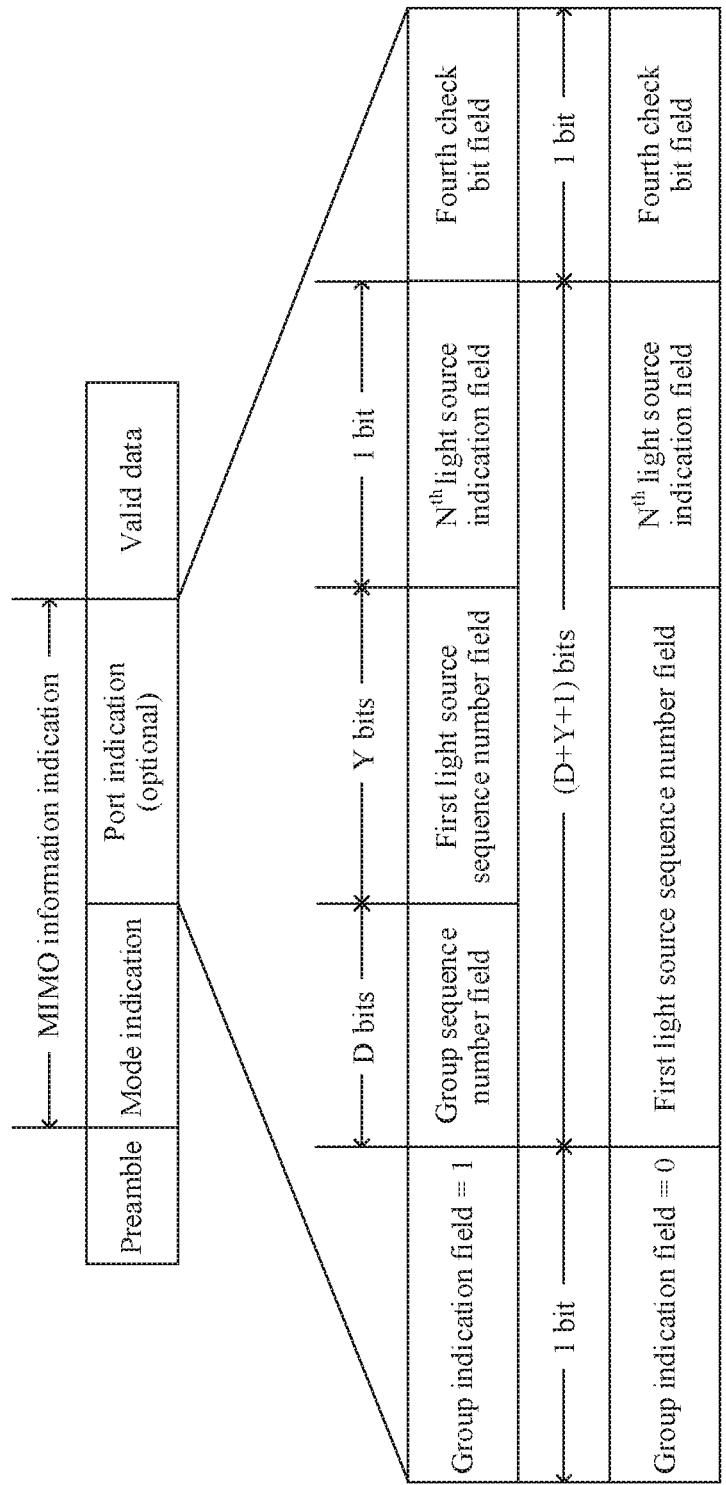
FIG. 11 is a schematic structural diagram of a further port indication according to an embodiment of this application.

FIG. 11 is a schematic structural diagram of a further port indication according to an embodiment of this application. The port indication includes a group indication field, a group sequence number field, a first light source sequence number field, an $N^{th}$ light source indication field, and a fourth check bit field. The group indication field is used to indicate whether the N light sources are grouped. If the N light sources are grouped, the group indication field may be set to 1. In addition, the group sequence number field is used to indicate a sequence number of the group. If the N light sources are not grouped, the group indication field may be set to 0. The port indication includes the group indication field, the first light source sequence number field, the $N^{th}$ light source indication field, and the fourth check bit field. For explanation of the $N^{th}$ light source indication field, refer to the foregoing description.

Optionally, the port indication includes Q symbols, and the Q symbols are used to indicate a total quantity of light sources and a light source sequence number. The total quantity of light sources indicates a quantity N of light sources used by the sending node to send the N physical frames. The light source sequence number indicates a sequence number of a light source used to send a current physical frame. For example, when Q=6, the first three symbols are used to indicate the total quantity of light sources, and the last three symbols are used to indicate the light source sequence number. Value of duty cycles of a symbol 1, a symbol 3, a symbol 4, and a symbol 6 are [0%, 100%], and value of duty cycles of a symbol 2 and a symbol 5 include [0%, 100%, some or all supported duty cycle values corresponding to the modulation order m]. There are a total of m'+2 (m'≤m) values, and the m'+2 values can support light source sequence numbers of 2×(m'+2)×2 light sources.

Optionally, the port indication includes Q symbols, Q−1 symbols in the Q symbols are used to indicate a light source sequence number, and a symbol other than the Q−1 symbols in the Q symbols is used to indicate whether a light source indicated by the light source sequence number is an $N^{th}$ light source. For example, when Q=4, symbols 1, 2, and 3 are used to indicate the light source sequence number, and a symbol 4 is used to indicate whether the light source indicated by the light source sequence number is the $N^{th}$ light source. Value of a duty cycle of the symbol 1 and a duty cycle of the symbol 3 are 10%, 100%, and a value of a duty cycle of the symbol 2 includes [0%, 100%, some or all supported duty cycle values corresponding to the modulation order m]. There are a total of m'+2 (m'≤m) values, and the m'+2 values can support light source sequence numbers of 2×(m'+2)×2 light sources. A value of a duty cycle of the symbol 4 may be 0% or 100%. When the value of the duty cycle of the symbol 4 is 0%, the symbol 4 may indicate that the light source indicated by the light source sequence number is the $N^{th}$ light source. When the value of the duty cycle of the symbol 4 is 100%, the symbol 4 may indicate that the light source indicated by the light source sequence number is not the $N^{th}$ light source.

Optionally, if the sending mode that is of the N light sources and that is indicated by the mode indication is the diversity mode, the mode indication of each physical frame includes one symbol. A duty cycle corresponding to one symbol included in each of mode indications of physical frames sent by using K1 light sources is a third duty cycle, a duty cycle corresponding to one symbol included in each of mode indications of physical frames sent by using K2 light sources is a fourth duty cycle, and K1+K2 is a total quantity of light sources. If the sending mode that is of the N light sources and that is indicated by the mode indication is the multiplexing mode, all duty cycles corresponding to symbols included in mode indications of the physical frames sent by using all of the light sources are the same.

S202: The sending node sends the N physical frames by using the N light sources, where one light source sends one physical frame.

The sending node may send, by using the N light sources, the N physical frames to the receiving node in a form of an optical signal. One light source sends one optical signal, and the optical signal carries one physical frame.

S203: The receiving node receives P physical frames sent by using P light sources.

The receiving node may receive all of the N physical frames sent by using the N light sources, or may receive only some of the N physical frames sent by using the N light sources, to be specific, P is less than or equal to N, where N is a positive integer greater than or equal to 2. Each of the physical frames includes a preamble, a mode indication, and valid data. For detailed explanations of the preamble, the mode indication, the port indication, and the valid data that are included in the physical frame, refer to the descriptions in S201. Details are not described in this embodiment of this application.

It should be noted that, when preambles are sent in groups, to be specific, when the preamble of the physical frame includes a symbol 0, a symbol m+1, and one of T preamble blocks, a duty cycle corresponding to the symbol 0 is a first duty cycle, a duty cycle corresponding to the symbol m+1 is a second duty cycle, and T is a quantity of groups of the N light sources. Each of the T preamble blocks includes K symbols, and duty cycles corresponding to the K symbols are some of all m duty cycles used for m-order UPWM. Duty cycles corresponding to K×T symbols included in the T preamble blocks include the m duty cycles, where T is a positive integer greater than or equal to 2, and K is an integer greater than or equal to 1 and less than or equal to m. The receiving node first needs to combine the received N physical frames, and combine the preamble blocks included in the N physical frames to form a complete preamble, to perform synchronization, phase error correction, and nonlinear compensation. The complete preamble includes a preamble of symbols from the symbol 0 to the symbol m+1, the duty cycle corresponding to the symbol 0 is the first duty cycle, and the duty cycle corresponding to the symbol m+1 is the second duty cycle, duty cycles corresponding to m symbols from a symbol 1 to a symbol m one-to-one correspond to all of the m duty cycles used for the m-order UPWM, where m is a modulation order used for the valid data included in the physical frame.

S204: The receiving node determines a sending mode of the N light sources of the sending node based on the mode indication.

In a possible implementation, the mode indication includes a first symbol. If the duty cycle corresponding to the first symbol is the third duty cycle, the receiving node determines that the sending mode that is of the N light sources and that is indicated by the mode indication is a diversity mode. If the duty cycle corresponding to the first symbol is the fourth duty cycle, the receiving node determines that the sending mode that is of the N light sources and that is indicated by the mode indication is a multiplexing mode.

In another possible implementation, the mode indication of each of the physical frames includes a second symbol and a third symbol, second symbols of all of the physical frames correspond to a same duty cycle, and third symbols of all of the physical frames correspond to a same duty cycle.

If the second symbol and the third symbol of each of the physical frames correspond to different duty cycles, the receiving node determines that the sending mode that is of the N light sources and that is indicated by the mode indication is the diversity mode, and if the second symbol and the third symbol of each of the physical frames correspond to a same duty cycle, the receiving node determines that the sending mode that is of the N light sources and that is indicated by the mode indication is the multiplexing mode. Alternatively, if the second symbol and the third symbol of each of the physical frames correspond to a same duty cycle, the receiving node determines that the sending mode that is of the N light sources and that is indicated by the mode indication is the diversity mode, and if the second symbol and the third symbol of each of the physical frames correspond to different duty cycles, the receiving node determines that the sending mode that is of the N light sources and that is indicated by the mode indication is the multiplexing mode.

If the sending mode that is of the N light sources and that is indicated by the mode indication is the diversity mode, S205 is performed.

S205: The receiving node obtains, based on valid data of one or L physical frames in the P physical frames, original data sent by the sending node by using the N light sources.

When the sending mode of the N light sources is the diversity mode, valid data included in each of the physical frames is the original data. In this case, the valid data of one of the P physical frames may be parsed, to obtain the original data sent by the sending node by using the N light sources. Certainly, the valid data of the L physical frames in the P physical frames may alternatively be parsed, to obtain the original data sent by the sending node by using the N light sources. Because the valid data of the L physical frames may be combined to reduce a bit error, the original data sent by the sending node by using the N light sources can be obtained by parsing the valid data of the L physical frames, where L is less than or equal to P.

Figure 12:
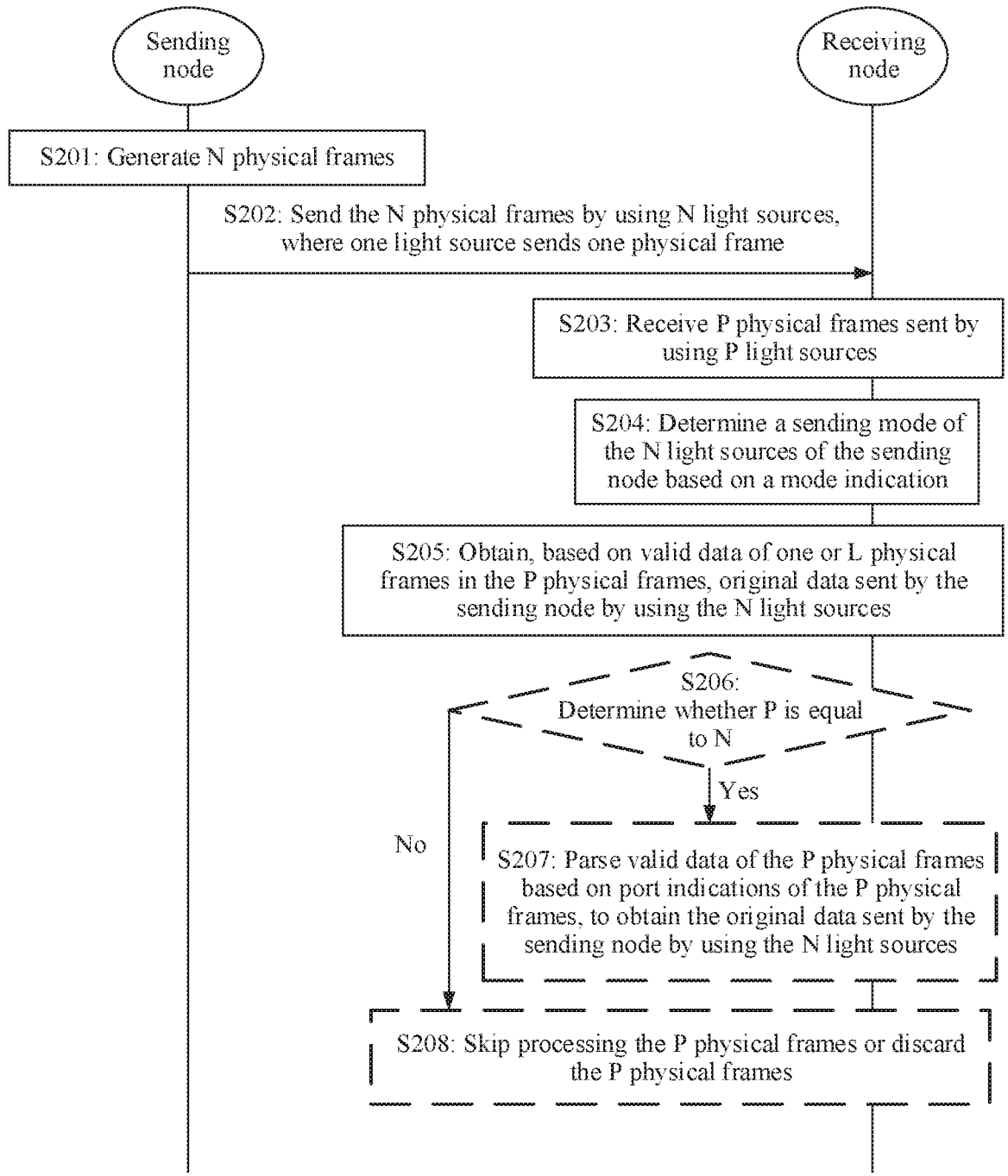
FIG. 12 is a flowchart of another communication method according to an embodiment of this application.

Further, if the sending mode that is of the N light sources and that is indicated by the mode indication is the multiplexing mode, as shown in FIG. 12, the communication method further includes the following detailed steps.

S206: The receiving node determines whether P is equal to N.

Whether P is equal to N may be determined by determining, based on the port indication, whether the receiving node has completely received the N physical frames sent by using the N light sources. If P is equal to N, S207 is performed. If P is less than N, S208 is performed.

For example, as shown in FIG. 6, the receiving node may determine the quantity N of light sources of the sending node based on an indication of the light source sum field, and determine whether P is equal to N. If P is equal to N, it indicates that the receiving node receives all of the N physical frames sent by using the N light sources. If P is less than N, it indicates that the receiving node fails to receive all of the N physical frames sent by using the N light sources.

For example, as shown in FIG. 7, the receiving node may determine, based on an indication of the $N^{th}$ light source indication field, whether the light source indicated by the first light source sequence number field is the $N^{th}$ light source. If one of the received P physical frames includes a first light source sequence number field indicating a light source that is the $N^{th}$ light source, the receiving node determines a value of N based on a port sequence number indicated in the physical frame, and determines whether P is equal to N. If none of the received P physical frames includes a first light source sequence number field indicating a light source that is the $N^{th}$ light source, it indicates that the receiving node has not completely received the N physical frames sent by using the N light sources, and the receiving node determines that P is less than N.

S207: The receiving node parses valid data of the P physical frames based on port indications of the P physical frames, to obtain the original data sent by the sending node by using the N light sources.

S208: The receiving node does not process the P physical frames or discards the P physical frames.

Certainly, if P is less than N, and the valid data of the P physical frames includes the original data, the valid data of the P physical frames may also be parsed based on the port indications of the P physical frames, to obtain the original data sent by the sending node by using the N light sources.

According to the communication method provided in this embodiment of this application, the mode indication is added to a frame structure of the physical frame, and the mode indication is used to indicate the sending mode of the N light sources, that is, a sending mode in which the original data is sent by using the N light sources. In this way, transmission is simultaneously performed by using the N light sources and transmission efficiency is increased. Further, the receiving node parses the received physical frames based on the mode indication to obtain the original data.

Figure 13:
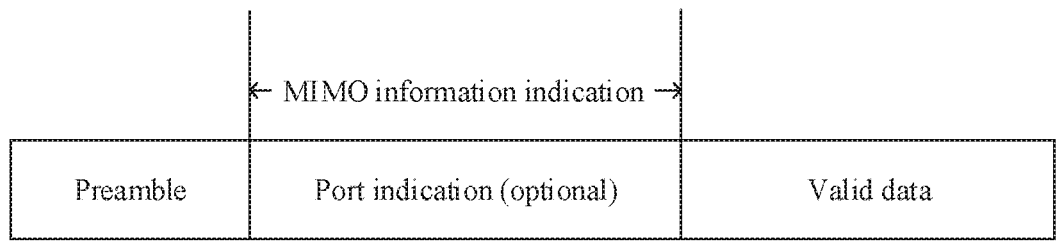
FIG. 13 is a schematic structural diagram of another physical frame according to an embodiment of this application.

In the communication method provided in the foregoing embodiment, each of the N physical frames includes the preamble, the mode indication, and the valid data. If the sending mode that is of the N light sources and that is indicated by the mode indication is the multiplexing mode, the physical frame further includes the port indication. In another possible implementation, each of the N physical frames includes the preamble and the valid data. If the sending mode that is of the N light sources and that is indicated by the mode indication is the multiplexing mode, the physical frame further includes the port indication. FIG. 13 is a schematic structural diagram of another physical frame according to an embodiment of this application. This embodiment of this application differs from the foregoing embodiment in that a preamble may be used to indicate the sending mode of the N light sources of the sending node.

The preamble in this embodiment of this application may be the preamble shown in FIG. 5, and includes a symbol 0 to a symbol m+1. A duty cycle corresponding to the symbol 0 is a first duty cycle, and a duty cycle corresponding to the symbol m+1 is a second duty cycle. Duty cycles corresponding to m symbols from a symbol 1 to a symbol m one-to-one correspond to all m duty cycles used for m-order UPWM, and m is a modulation order used for valid data included in the physical frame. Different sequences of the symbols from the symbol 1 to the symbol m included in the preamble are used to indicate the sending modes of the N light sources of the sending node. Alternatively, different sequences of X1 symbols in the symbols from the symbol 1 to the symbol m included in the preamble are used to indicate the sending modes. The sending mode is a diversity mode or a multiplexing mode.

If the sending mode indicated by the different sequences of the symbols from the symbol 1 to the symbol m included in the preamble is the multiplexing mode, each physical frame further includes a first port indication. For a specific implementation of the first port indication, refer to the detailed descriptions of the port indication in the foregoing embodiment. Details are not described herein in this embodiment of this application.

For example, when the symbols from the symbol 1 to the symbol m are sorted in descending order, the sending mode is the diversity mode, and when the symbols from the symbol 1 to the symbol m are sorted in ascending order the sending mode is the multiplexing mode. Alternatively, when the symbols from the symbol 1 to the symbol m are sorted in ascending order, the sending mode is the diversity mode, and when the symbols from the symbol 1 to the symbol m are sorted in descending order, the sending mode is the multiplexing mode. As shown in Table 3, it is assumed that m=3, a duty cycle corresponding to a symbol 1 is 25%, a duty cycle corresponding to a symbol 2 is 50%, and a duty cycle corresponding to a symbol 3 is 75%. When the symbol 1 to the symbol 3 are sorted in ascending order, the sending mode is the multiplexing mode. When the symbols from the symbol 1 to the symbol 3 are sorted in descending order, the sending mode is the diversity mode.

TABLE 3

| Mode | Duty cycle sequence of a preamble | Meaning | Port indication | Example (m = 3) |
|---|---|---|---|---|
| Multiplexing mode | All light sources send a same preamble, and duty cycles of $S_1$ to $S_m$ are sorted in ascending order. | Each frame of data is sent in parallel by using a light source array | Indication | 0%<br>25%<br>50%<br>75%<br>100% |
| Diversity mode | All light sources send a same preamble, and duty cycles of $S_1$ to $S_m$ are sorted in descending order. | Light sources in a light source array send same data | No indication | 0%<br>75%<br>50%<br>25%<br>100% |

After the receiving node receives the physical frame, if the symbols from the symbol 1 to the symbol m in are sorted in descending order, the receiving node determines that the sending mode is the diversity mode, and if the symbols from the symbol 1 to the symbol mare sorted in ascending order, the receiving node determines that the sending mode is the multiplexing mode; or if the symbols from the symbol 1 to the symbol mare sorted in ascending order, the receiving node determines that the sending mode is the diversity mode, and if the symbols from the symbol 1 to the symbol mare sorted in descending order, the receiving node determines that the sending mode is the multiplexing mode.

In a possible implementation, if the sending mode indicated by the different sequences of the X1 symbols in the symbols from the symbol 1 to the symbol m included in the preamble is the multiplexing mode, and when X2 symbols other than the X1 symbols in the symbols from the symbol 1 to the symbol m included in the preamble of each physical frame are used to indicate a light source sequence number, each physical frame further includes a second port indication, where X1+X2≤m, the light source sequence number indicates a sequence number of a light source used to send a current physical frame, and the total quantity of light sources indicates a quantity N of light sources used by the sending node to send N physical frames.

Figure 14:
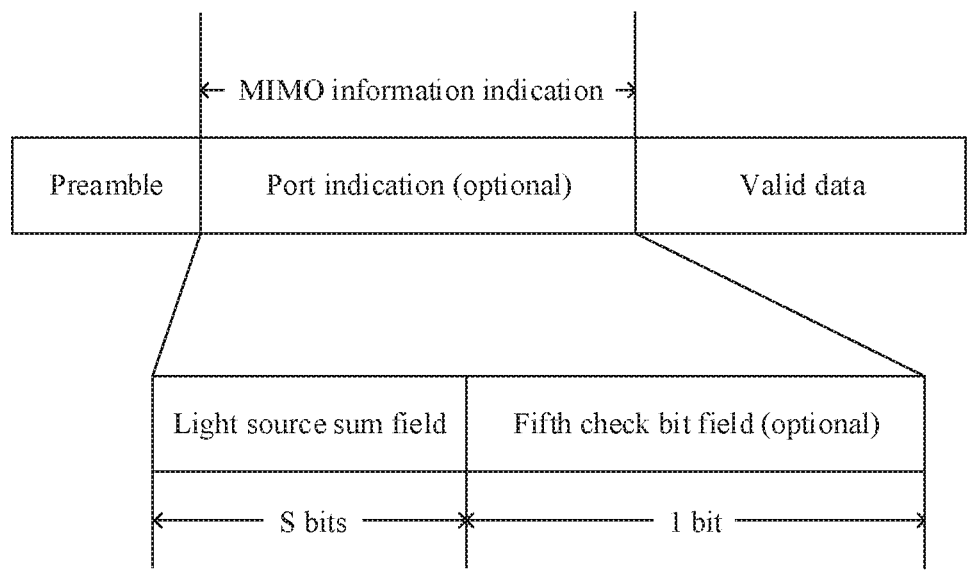
FIG. 14 is a schematic structural diagram of a still further port indication according to an embodiment of this application.

FIG. 14 is a schematic structural diagram of a still further port indication according to an embodiment of this application. A second port indication includes a light source sum field. Optionally, the second port indication further includes a fifth check bit field.

Optionally, the second port indication includes R symbols, and the R symbols are used to indicate a total quantity of light sources or indicate whether a light source indicated by a light source sequence number is an $N^{th}$ light source. A duty cycle corresponding to a first symbol in the R symbols may be 0%, and a duty cycle corresponding to an $R^{th}$ symbol may be 100%.

After the receiving node receives the physical frame, the receiving node determines, based on the sending mode indicated by the different sequences of the X1 symbols in the symbols from the symbol 1 to the symbol m included in the preamble, that the sending mode is the diversity mode or the multiplexing mode.

If the sending mode indicated by the different sequences of the X1 symbols in the symbols from the symbol 1 to the symbol m included in the preamble is the multiplexing mode, in another possible implementation, X3 symbols other than the X1 symbols and the X2 symbols in the symbols from the symbol 1 to the symbol m included in the preamble are used to indicate the total quantity of light sources, where X1+X2+X3≤m.

For example, the different sequences of the first X1 symbols ($S_1$ to $S_{X1}$) in the symbols from the symbol 1 to the symbol m are used to indicate the sending mode, different sequences of the X2 symbols ($S_{X1+1}$ to $S_{X1+X2}$) located in the middle of the symbols from the symbol 1 to the symbol m are used to indicate the light source sequence number, and different sequences of the last X3 symbols ($S_{X1+X2+1}$ to $S_m$) in the symbols from the symbol 1 to the symbol m are used to indicate the total quantity of light sources. X1 may be equal to 2. In addition, in the diversity mode, sequences of the X2 symbols located in the middle of the symbols from the symbol 1 to the symbol m and sequences of the last X3 symbols remain unchanged, and should be set to fixed sequences. In this case, a duty cycle sequence of the X2 symbols located in the middle of the symbols from the symbol 1 to the symbol m also remains unchanged, and a duty cycle sequence of the last X3 symbols also remains unchanged.

After the receiving node receives the physical frame, the receiving node determines, based on the sending mode indicated by the X1 symbols in the symbols from the symbol 1 to the symbol m included in the preamble, that the sending mode is the diversity mode or the multiplexing mode.

After the receiving node determines the sending mode, if the sending mode indicated by the preamble is the diversity mode, original data sent by the sending node by using the N light sources is obtained based on valid data of one or L physical frames in P physical frames, where L is less than or equal to P. If the sending mode indicated by the different sequences of the symbols from the symbol 1 to the symbol m included in the preamble is the multiplexing mode, each physical frame further includes a first port indication. If the sending mode indicated by the different sequences of the X1 symbols in the symbols from the symbol 1 to the symbol m included in the preamble is the multiplexing mode, and when X2 symbols other than the X1 symbols in the symbols from the symbol 1 to the symbol m included in the preamble of each physical frame are used to indicate a light source sequence number, each physical frame further includes a second port indication, where X1+X2≤m. Alternatively, X3 symbols other than the X1 symbols and the X2 symbols in the symbols from the symbol 1 to the symbol m included in the preamble are used to indicate the total quantity of light sources, where X1+X2+X3≤m. The light source sequence number indicates a sequence number of a light source used to send a current physical frame, and the total quantity of light sources indicates a quantity N of light sources used by the sending node to send N physical frames. The receiving node determines whether P is equal to N, and if P is equal to N, parses valid data of the P physical frames based on preambles and/or port indications of the P physical frames, to obtain the original data sent by the sending node by using the N light sources, where the port indication includes the first port indication or the second port indication. For detailed explanation, refer to the descriptions in the foregoing embodiments. Details are not described in this embodiment of this application.

The foregoing mainly describes the solutions provided in the embodiments of this application from a perspective of interaction between network elements. It may be understood that, to implement the foregoing functions, each of the network elements, for example, the sending node or the receiving node, includes corresponding hardware structures and/or software modules for performing the functions. A person skilled in the art should easily be aware that, in combination with the examples described in the embodiments disclosed in this specification, algorithm steps can be implemented by hardware or a combination of hardware and computer software. Whether a function is performed by hardware or hardware driven by computer software depends on particular applications and design constraints of the technical solutions. A person skilled in the art may use different methods to implement the described functions for each particular application, but it should not be considered that the implementation goes beyond the scope of this application.

In the embodiments of this application, functional modules of the sending node and the receiving node may be obtained through division based on the foregoing method examples. For example, functional modules may be obtained through division in correspondence with functions, or two or more functions may be integrated into one processing module. The integrated module may be implemented in a form of hardware, or may be implemented in a form of a software functional module. It should be noted that, in the embodiments of this application, division into the modules is an example, is merely logical function division, and may be another division in actual implementation.

Figure 15:
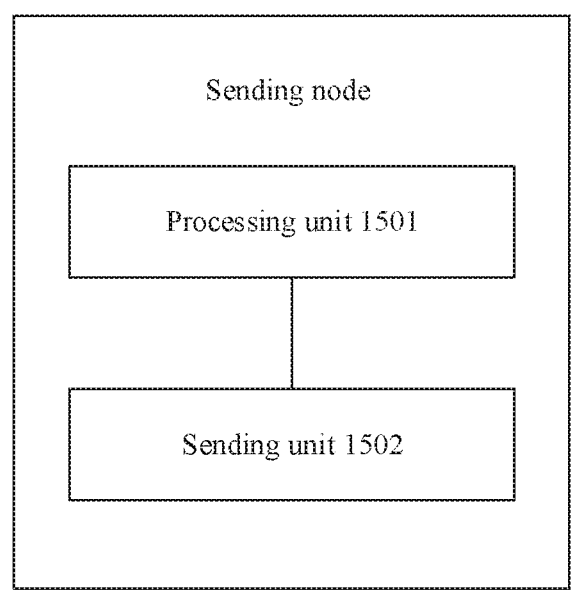
FIG. 15 is a schematic structural diagram of a sending node according to an embodiment of this application.

When each functional module is obtained through division based on each corresponding function, FIG. 15 is a possible schematic composition diagram of the sending node in the foregoing embodiments. As shown in FIG. 15, the sending node may include a processing unit 1501 and a sending unit 1502.

The processing unit 1501 is configured to support the sending node in performing S201 in the communication method shown in FIG. 2 and S201 in the communication method shown in FIG. 12.

The sending unit 1502 is configured to support the sending node in performing S202 in the communication method shown in FIG. 2 and S202 in the communication method shown in FIG. 12.

It should be noted that all related content of the steps in the foregoing method embodiments may be cited in function descriptions of corresponding functional modules. Details are not described herein.

The sending node provided in this embodiment of this application is configured to perform the foregoing communication methods, and therefore can achieve an effect that is the same as that of the foregoing communication methods.

Figure 16:
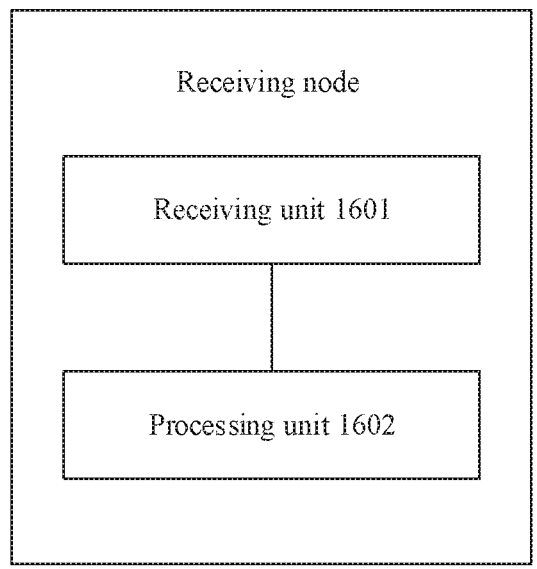
FIG. 16 is a schematic structural diagram of a receiving node according to an embodiment of this application.

When each functional module is obtained through division based on each corresponding function, FIG. 16 is a possible schematic composition diagram of the receiving node in the foregoing embodiments. As shown in FIG. 16, the receiving node may include a receiving unit 1601 and a processing unit 1602.

The receiving unit 1601 is configured to support the receiving node in performing S203 in the communication method shown in FIG. 2 and S203 in the communication method shown in FIG. 12.

The processing unit 1602 is configured to support the receiving node in performing S204 and S205 in the communication method shown in FIG. 2, and S204 to S208 in the communication method shown in FIG. 12.

It should be noted that all related content of the steps in the foregoing method embodiments may be cited in function descriptions of corresponding functional modules. Details are not described herein.

The receiving node provided in this embodiment of this application is configured to perform the foregoing communication methods, and therefore can achieve an effect that is the same as that of the foregoing communication methods.

Figure 17:
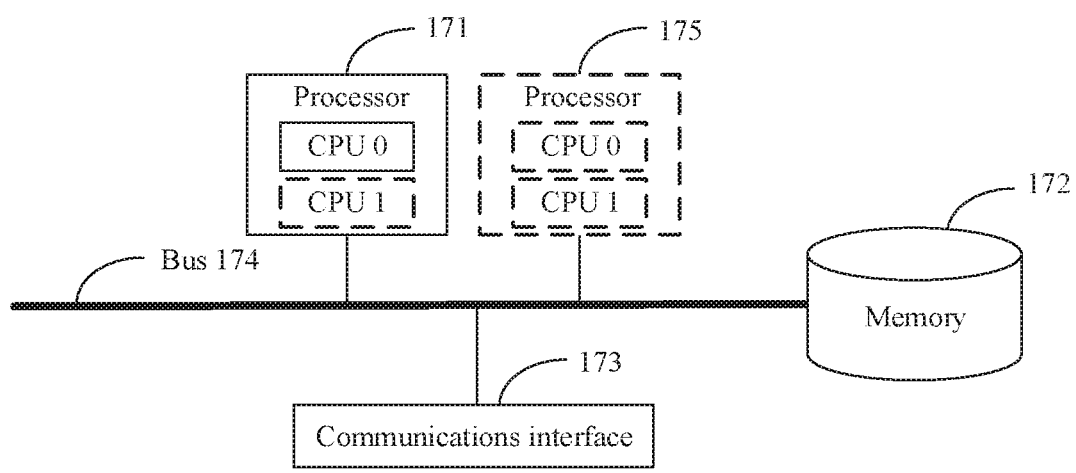
FIG. 17 is a schematic composition diagram of a computer device according to an embodiment of this application.

FIG. 17 is a schematic composition diagram of a computer device according to an embodiment of this application. As shown in FIG. 17, the computer device may include at least one processor 171, a memory 172, a communications interface 173, and a communications bus 174.

The following describes constituent parts of the computer device in detail with reference to FIG. 17.

The processor 171 is a control center of the computer device, and may be one processor, or may be a collective name of a plurality of processing elements. During specific implementation, in an embodiment, the processor 171 may include one central processing unit (Central Processing Unit, CPU) or a plurality of CPUs, for example, a CPU 0 and a CPU 1 shown in FIG. 17. The processor 171 may alternatively be an application-specific integrated circuit (Application-Specific Integrated Circuit, ASIC), or may be one or more integrated circuits configured to implement the embodiments of this application, for example, one or more digital signal processor (DSP) or one or more field programmable gate arrays (Field Programmable Gate Array, FPGA).

An example in which the processor 171 includes one or more CPUs is used. The processor 171 may perform various functions of the computer device by running or executing a software program stored in the memory 172 and invoking data stored in the memory 172.

During specific implementation, in an embodiment, the computer device may include a plurality of processors, for example, the processor 171 and a processor 175 shown in FIG. 17. Each of the processors may be a single-core processor (single-core, CPU) or may be a multi-core processor (multi-CPU). The processor herein may be one or more devices, circuits, and/or processing cores for processing data (for example, computer program instructions).

In a possible implementation of this embodiment of this application, the computer device may be a sending node, and the processor 171 is mainly configured to generate N physical frames.

In another possible implementable of this embodiment of this application, the computer device may be a receiving node, and the processor 171 is mainly configured to: determine a sending mode of N light sources of a sending node based on a mode indication, and determine valid data of one or L physical frames in P physical frames; or parse valid data of P physical frames based on port indications of the P physical frames, to obtain original data sent by the sending node by using the N light sources.

It should be noted that all related content of the steps in the foregoing method embodiments may be cited in function descriptions of corresponding functional modules. Details are not described herein.

The receiving node or the sending node provided in this embodiment of this application is configured to perform the foregoing communication methods, and therefore can achieve an effect that is the same as that of the foregoing communication methods.

The memory 172 may be a read-only memory (Read-Only Memory, ROM) or another type of static storage device capable of storing static information and an instruction, a random access memory (Random Access Memory, RAM) or another type of dynamic storage device capable of storing information and an instruction, or may be an electrically erasable programmable read-only memory (Electrically Erasable Programmable Read-Only Memory, EEPROM), a compact disc read-only memory (Compact Disc Read-Only Memory, CD-ROM) or another compact disc storage, an optical disc storage (including a compact disc, a laser disc, an optical disc, a digital versatile disc, a Blu-ray disc, and the like), a magnetic disk storage medium or another magnetic storage device, or any other medium that is capable of carrying or storing expected program code in a form of an instruction or a data structure and that can be accessed by a computer. However, this application is not limited thereto. The memory 172 may exist independently and is connected to the processor 171 by using the communications bus 174. The memory 172 may alternatively be integrated with the processor 171.

The memory 172 is configured to store the software program for performing the solutions of this application, and the processor 171 controls execution of the software program.

The communications interface 173 is configured to communicate, by using any apparatus such as a transceiver, with another device or a communications network such as the Ethernet, a radio access network (Radio Access Network, RAN), or a wireless local area network (Wireless Local Area Network, WLAN). The communications interface 173 may include a receiving unit for implementing a receiving function and a sending unit for implementing a sending function.

The communications bus 174 may be an industry standard architecture (Industry Standard Architecture, ISA) bus, a peripheral component interconnect (Peripheral Component Interconnect, PCI) bus, an extended industry standard architecture (Extended Industry Standard Architecture, EISA) bus, or the like. The bus may be classified into an address bus, a data bus, a control bus, and the like. For ease of representation, only one thick line is used to indicate the bus in FIG. 17, but this does not mean that there is only one bus or only one type of bus.

A structure of the device shown in FIG. 17 does not constitute a limitation on the computer device. The computer device may include components more or fewer than those shown in the figure, may combine some components, or may have a different component arrangement. For example, in this embodiment of this application, an LED array or an LD array may further be included.

Figure 18:
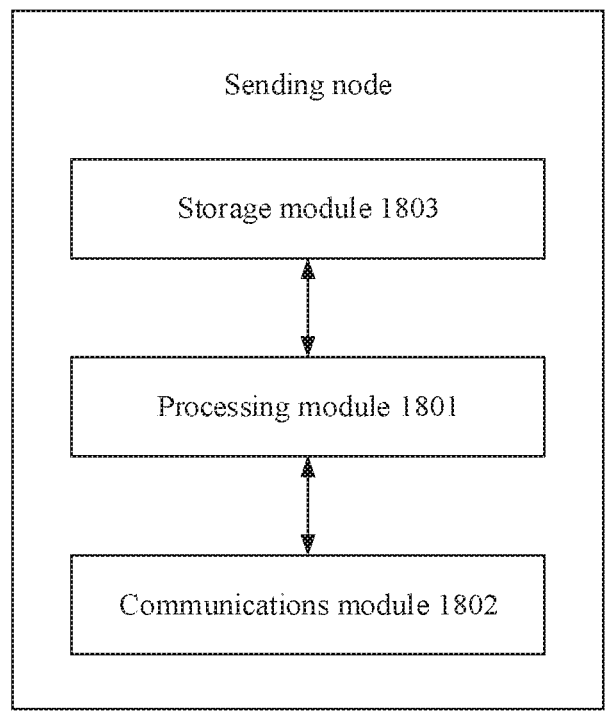
FIG. 18 is a schematic structural diagram of another sending node according to an embodiment of this application.

When an integrated unit is used, FIG. 18 is another possible schematic composition diagram of the sending node in the foregoing embodiments. As shown in FIG. 18, the sending node includes a processing module 1801 and a communications module 1802.

The processing module 1801 is configured to control and manage an action of the sending node. For example, the processing module 1801 is configured to support the sending node in performing S201 in FIG. 2, and/or is configured to perform another process of the technology described in this specification. The communications module 1802 is configured to support communication between the sending node and another network entity. Specifically, for example, the communications module 1802 is configured to support the sending node in performing S203 in FIG. 2. The sending node may further include a storage module 1803, configured to store program code and data of the sending node.

The processing module 1801 may be a processor or a controller. The processor may implement or execute various example logical blocks, modules, and circuits described with reference to content disclosed in this application. Alternatively, the processor may be a combination of processors implementing a computing function, for example, a combination including one or more microprocessors, or a combination of a DSP and a microprocessor. The communications module 1802 may be a transceiver, a transceiver circuit, a communications interface, or the like. The storage module 1803 may be a memory.

When the processing module 1801 is a processor, the communications module 1802 is a communications interface, and the storage module 1803 is a memory, the sending node in this embodiment of this application may be the computer device shown in FIG. 17.

Figure 19:
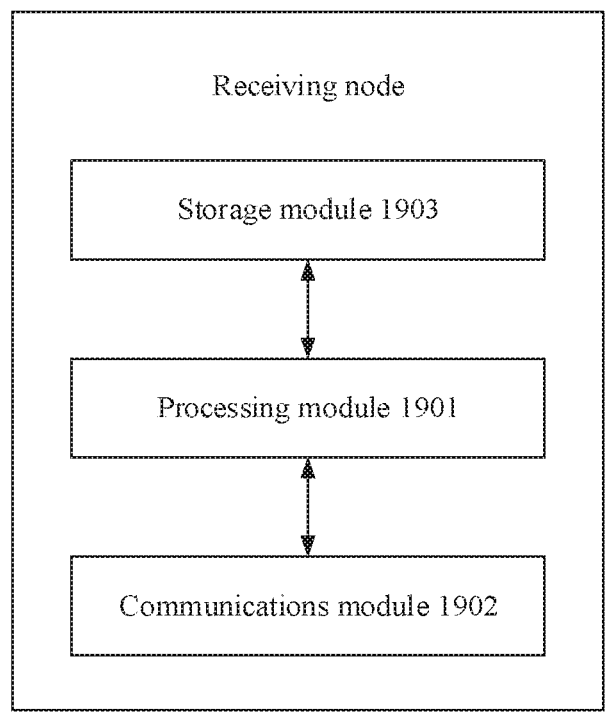
FIG. 19 is a schematic structural diagram of another receiving node according to an embodiment of this application.

When an integrated unit is used, FIG. 19 is another possible schematic composition diagram of the receiving node in the foregoing embodiments. As shown in FIG. 19, the receiving node includes a processing module 1901 and a communications module 1902.

The processing module 1901 is configured to control and manage actions of the receiving node. For example, the processing module 1901 is configured to support the receiving node in performing S204 and S205 in FIG. 2 and S204 to S208 in FIG. 12, and/or is configured to perform another process for the technology described in this specification. The communications module 1902 is configured to support communication between the receiving node and another network entity. Specifically, for example, the communications module 1902 is configured to support the receiving node in performing S203 in FIG. 2. The receiving node may further include a storage module 1903, configured to store program code and data of the receiving node.

The processing module 1901 may be a processor or a controller. The processor may implement or execute various example logical blocks, modules, and circuits described with reference to content disclosed in this application. Alternatively, the processor may be a combination of processors implementing a computing function, for example, a combination including one or more microprocessors, or a combination of a DSP and a microprocessor. The communications module 1902 may be a transceiver, a transceiver circuit, a communications interface, or the like. The storage module 1903 may be a memory.

When the processing module 1901 is a processor, the communications module 1902 is a communications interface, and the storage module 1903 is a memory, the receiving node in this embodiment of this application may be the computer device shown in FIG. 17.

The foregoing descriptions about implementations allow a person skilled in the art to clearly understand that, for the purpose of convenient and brief description, division into the foregoing functional modules is used as an example for illustration. In actual application, the foregoing functions can be allocated to different functional modules based on a requirement and implemented by the different functional modules. To be specific, an inner structure of an apparatus is divided into different functional modules to implement all or some of the foregoing functions.

In the several embodiments provided in this application, it should be understood that the disclosed apparatus and method may be implemented in another manner. For example, the foregoing apparatus embodiment is merely an example. For example, division into the modules or the units is merely logical function division and may be other division in actual implementation. For example, a plurality of units or components may be combined or integrated into another apparatus, or some features may be ignored or not performed. In addition, the displayed or discussed mutual couplings or direct couplings or communication connections may be implemented through some interfaces. The indirect couplings or communication connections between the apparatuses or the units may be implemented in electronic, mechanical, or another form.

The units described as separate parts may or may not be physically separate, and parts displayed as units may be one or more physical units, may be located in one place, or may be distributed to different places. Some or all of the units may be selected based on an actual requirement to achieve the objectives of the solutions of the embodiments.

In addition, functional units in the embodiments of this application may be integrated into one processing unit, or each of the units may exist alone physically, or two or more units are integrated into one unit. The integrated unit may be implemented in a form of hardware, or may be implemented in a form of a software functional unit.

When the integrated unit is implemented in the form of a software functional unit and sold or used as an independent product, the integrated unit may be stored in a readable storage medium. Based on such an understanding, the technical solutions of this application essentially, or the part contributing to the prior art, or all or some of the technical solutions may be implemented in the form of a software product. The software product is stored in a storage medium and includes several instructions for instructing a device (which may be a single-chip microcomputer, a chip or the like) or a processor (processor) to perform all or some of the steps of the methods described in the embodiments of this application. The foregoing storage medium includes any medium that can store program code, such as a USB flash drive, a removable hard disk, a ROM, a RAM, a magnetic disk, or an optical disc.

The foregoing descriptions are merely specific implementations of this application, but are not intended to limit the protection scope of this application. Any variation or replacement within the technical scope disclosed in this application shall fall within the protection scope of this application. Therefore, the protection scope of this application shall be subject to the protection scope of the claims.

What is claimed is:

1. A communication method comprising:
   receiving P physical frames sent by using P light sources, wherein each of the physical frames comprises a preamble, a mode indication, and valid data, the mode indication indicates a sending mode of N light sources of an optical device, the sending mode is a diversity mode or a multiplexing mode, N is a positive integer greater than or equal to 2, and P is less than or equal to N;
   determining the sending mode of the N light sources of the optical device based on the mode indication;
   if the sending mode indicated by a mode indication is the diversity mode, obtaining, based on valid data of L physical frames in the P physical frames, original data sent by the optical device-by using the N light sources, wherein L is a positive integer less than or equal to P;
   if the sending mode-indicated by the mode indication is the multiplexing mode, each of the P physical frames further comprises a port indication, and the method further comprises:
     determining whether P is equal to N; and
     if P is equal to N, parsing valid data of the P physical frames based on the port indication of each of the P physical frames, to obtain the original data sent by the optical device by using the N light sources.

2. A computing device, comprising:
   a receiver, configured to receive P physical frames sent by using P light sources, wherein each of the physical frames comprises a preamble, a mode indication, and valid data, the mode indication is used to indicate a sending mode of N light sources of an optical device, the sending mode is a diversity mode or a multiplexing mode, N is a positive integer greater than or equal to 2, and P is less than or equal to N; and
   at least one processor; and
   a non-transitory computer-readable storage medium coupled to the at least one processor and storing programming instructions for execution by the at least one processor, the programming instructions instruct the at least one processor to:
   determine the sending mode of the N light sources of the optical device based on the mode indication; and
   if the sending mode that is of the N light sources and that is indicated by the mode indication is the diversity mode, obtain, based on valid data of one or L physical frames in the P physical frames, original data sent by the optical device by using the N light sources, wherein L is less than or equal to P;
   if the sending mode-indicated by the mode indication is the multiplexing mode, each of the P physical frames further comprises a port indication, and the programming instructions further instruct the at least one processor to:
     determine whether P is equal to N; and
     if P is equal to N, parse valid data of the P physical frames based on the port indication of each of the P physical frames, to obtain the original data sent by the optical device by using the N light sources.

3. A communication method comprising:
   generating, by an optical device, N physical frames, wherein each of the N physical frames comprises a preamble and valid data, and N is a positive integer greater than or equal to 2; and
   sending each of the N physical frames by using a corresponding light source of N light sources; and wherein the preamble comprises a total of $m+2$ symbols from a symbol 0 to a symbol $m+1$, a duty cycle corresponding to the symbol 0 is a first duty cycle, a duty cycle corresponding to the symbol $m+1$ is a second duty cycle, duty cycles corresponding to m symbols from a symbol 1 to a symbol m correspond tom other duty cycles for an m-order undersampled pulse width modulation, wherein m is a modulation order for the valid data-a sequence of symbols selected from the symbol 1 to the symbol m comprised in the preamble indicates a sending mode of the N light sources of the optical device, and wherein the sending mode is a diversity mode or a multiplexing mode.

4. The method according to claim 3, wherein the sending mode is a multiplexing mode, and
   each of the N physical frames further comprises a first port indication if the sequence includes all the symbols from the symbol 1 to the symbol m.

5. The method according to claim 3, wherein the sending mode is a multiplexing mode, if the sequence includes X1 symbols selected from the symbol 1 to the symbol m, and if X2 symbols other than the X1 symbols in the symbols from the symbol 1 to the symbol m indicates a light source sequence number, each of the N physical frames further comprises a second port indication, wherein $X1+X2 \leq m$, wherein the light source sequence number indicates a sequence number of a light source for sending a current physical frame.

6. The method according to claim 5, wherein X3 symbols other than the X1 symbols and the X2 symbols in the symbols from the symbol 1 to the symbol indicate that a total quantity of light sources is N, wherein $X1+X2+X3 \leq m$.

7. A communication method, wherein the method is applied to a computing device and comprises:
   receiving P physical frames sent by using P light sources of N light sources comprised in an optical device, wherein each of the P physical frames comprises a preamble and valid data, the preamble comprises $m+2$ total symbols from a symbol 0 to a symbol $m+1$, a duty cycle corresponding to the symbol 0 is a first duty cycle, a duty cycle corresponding to the symbol $m+1$ is a second duty cycle, duty cycles corresponding to m symbols from a symbol 1 to a symbol m correspond to m other duty cycles for an m-order undersampled pulse width modulation, wherein m is a modulation order for the valid data-a sequence of symbols selected from the symbol 1 to the symbol m comprised in the preamble indicates a sending mode of the N light sources of the optical device, and wherein the sending mode is a diversity mode or a multiplexing mode, wherein N is a positive integer greater than or equal to 2, and P is less than or equal to N; and
   determining the sending mode of the N light sources of the optical device based on the preamble.

8. An optical device comprising:
   N light sources;
   at least one processor, configured to generate N physical frames, wherein each of the physical frames comprises a preamble and valid data, and N is a positive integer greater than or equal to 2; and
   a transmitter, configured to send each of the N physical frames by using a corresponding light source of the N light sources; and wherein
   the preamble comprises a total of $m+2$ symbols from a symbol 0 to a symbol $m+1$, a duty cycle corresponding to the symbol 0 is a first duty cycle, a duty cycle corresponding to the symbol m+1 is a second duty cycle, duty cycles corresponding to m symbols from a symbol 1 to a symbol m correspond to m other duty cycles for an m-order undersampled pulse width modulation, wherein m is a modulation order for the valid data-a sequence of symbols selected from the symbol 1 to the symbol m comprised in the preamble indicates a sending mode of the N light sources of the optical device, and wherein the sending mode is a diversity mode or a multiplexing mode.

9. The optical device according to claim 8, wherein each of the N physical frames further comprises a first port indication if the sequence includes all the symbols from the symbol 1 to the symbol m.

10. The optical device according to claim 8, further comprising:
in response to determining that the sending mode indicated by the preamble is the diversity mode, obtaining, based on valid data of L physical frames in the P physical frames, original data sent by the optical device by using the N light sources, wherein L is less than or equal to P; and
in response to determining the sending mode is a multiplexing mode, determining that each of X1 symbols and X2 symbols from the symbol 1 to the symbol m comprises a port indication, wherein the X1 symbols indicate the sending mode, the X2 symbols indicate a light source sequence number, X3 symbols from the symbol 1 to the symbol m indicate a total quantity of N light sources, and wherein X1, X2, and X3 are non-negative integers, and X1+X2+X3≤m, the light source sequence number indicates a sequence number of a light source for sending a current physical frame;
determining whether P is equal to N; and
in response to determining that P is equal to N, parsing valid data of the P physical frames based on the preambles or port indications of the P physical frames, to obtain the original data sent by the optical device.

11. The optical device according claim 9, wherein if the sending mode is a multiplexing mode, and if X2 symbols other than X1 symbols in the symbols from the symbol 1 to the symbol m comprised in the preamble of each of the physical frames are used to indicate a light source sequence number, each of the physical frames further comprises a second port indication, wherein X1+X2≤m, or X3 symbols other than the X1 symbols and the X2 symbols in the symbols from the symbol 1 to the symbol m comprised in the preamble are used to indicate a total quantity of light sources, wherein X1+X2+X3≤m; and wherein the light source sequence number indicates a sequence number of a light source used to send a current physical frame, and the total quantity of light sources indicates a quantity N of light sources used by the optical device to send the N physical frames.

12. A computing device, comprising:
a receiver, configured to receive P physical frames sent by using P light sources, wherein each of the physical frames comprises a preamble and valid data, the preamble comprises a total of m+2 symbols from a symbol 0 to a symbol m+1, a duty cycle corresponding to the symbol 0 is a first duty cycle, a duty cycle corresponding to the symbol m+1 is a second duty cycle, duty cycles corresponding to m symbols from a symbol 1 to a symbol m correspond to m other duty cycles for an m-order undersampled pulse width modulation, wherein m is a modulation order used for the valid data-a sequence of symbols selected from the symbol 1 to the symbol m comprised in the preamble indicates a sending mode of N light sources of an optical device, and wherein the sending mode is a diversity mode or a multiplexing mode, wherein N is a positive integer greater than or equal to 2, and P is less than or equal to N; and
at least one processor, configured to:
determine the sending mode of the N light sources of the optical device-based on the preamble; and
if the sending mode indicated by the preamble is the diversity mode, obtain, based on valid data of L physical frames in the P physical frames, original data sent by the optical device-by using the N light sources, wherein L is a positive integer less than or equal to P.

13. The computing device according to claim 12, wherein the sending mode-is a multiplexing mode, if the sequence includes X1 symbols selected-from the symbol 1 to the symbol m, and if X2 symbols other than the X1 symbols in the symbols from the symbol 1 to the symbol m indicates a light source sequence number, each of the N physical frames further comprises a second port indication, wherein X1+X2≤m, wherein the light source sequence number indicates a sequence number of a light source for sending a current physical frame, X3 symbols other than the X1 symbols and the X2 symbols in the symbols from the symbol 1 to the symbol m indicate that a total quantity of light sources is N, wherein X1+X2+X3≤m;
the processor is further configured to:
determine whether P is equal to N; and
if P is equal to N, parse valid data of the P physical frames based on the preambles or port indications of the P physical frames, to obtain the original data sent by the optical device.

* * * * *